(12) United States Patent
Yoshidome

(10) Patent No.: US 10,138,088 B2
(45) Date of Patent: *Nov. 27, 2018

(54) IMAGE FORMING APPARATUS WITH A FINISHER TO APPLY A NOTE ONTO A PRINTED PAGE

(71) Applicant: KYOCERA Document Solutions Inc., Osaka (JP)

(72) Inventor: Gin Yoshidome, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,648

(22) Filed: Jun. 13, 2017

(65) Prior Publication Data

US 2017/0283209 A1    Oct. 5, 2017

Related U.S. Application Data

(63) Continuation of application No. 15/087,988, filed on Mar. 31, 2016, now Pat. No. 9,695,006.

(51) Int. Cl.
| | |
|---|---|
| *B65H 39/10* | (2006.01) |
| *B26D 1/06* | (2006.01) |
| *B26D 7/01* | (2006.01) |
| *B65H 39/02* | (2006.01) |

(Continued)

(52) U.S. Cl.
CPC ............. *B65H 39/10* (2013.01); *B26D 1/065* (2013.01); *B26D 7/015* (2013.01); *B65H 39/02* (2013.01); *G03G 15/6541* (2013.01); *G06F 3/1206* (2013.01); *G06F 3/1271* (2013.01); *B65H 2301/43827* (2013.01); *B65H 2301/5113* (2013.01); *B65H 2301/51532* (2013.01); *B65H 2511/20* (2013.01); *B65H 2511/415* (2013.01); *B65H 2801/27* (2013.01); *G03G 15/6544* (2013.01); *G03G 2215/00814* (2013.01);

(Continued)

(58) Field of Classification Search
CPC ....... B41J 11/70; B41J 11/663; B41J 11/0045; B41J 11/66; B26D 7/34; B26D 7/015; B26D 1/065; B65H 39/10; B65H 39/02; B65H 2301/43827; B65H 2511/20; B65H 2301/5113; B65H 2801/27; B65H 2511/415; B65H 2301/51532; G09F 2003/0201; G06F 3/1271; G06F 3/1206; G03G 15/6541; G03G 15/6544; G03G 2215/0177; G03G 2215/00822; G03G 2215/00814
USPC ............................................. 412/16; 347/110
See application file for complete search history.

(56) References Cited

U.S. PATENT DOCUMENTS

| | | |
|---|---|---|
| 4,680,083 A | 7/1987 | Kashiwaba |
| 5,897,250 A | 4/1999 | Hirai et al. |
| 6,019,865 A | 2/2000 | Palmer et al. |

(Continued)

*Primary Examiner* — Stephen Meier
*Assistant Examiner* — Alexander D Shenderov
(74) *Attorney, Agent, or Firm* — McDonnell Boehnen Hulbert & Berghoff LLP

(57) ABSTRACT

A finishing unit for applying a note onto a printed document that exits from an image forming apparatus is provided. The finishing unit, according to one embodiment, includes a note cutting unit for cutting a sheet of paper to a note of a desired size and a note pasting unit for applying the note onto the printed document that exits from the image forming apparatus. An image forming apparatus and method of applying a note onto a printed are also described.

20 Claims, 18 Drawing Sheets

(51) Int. Cl.
*G03G 15/00* (2006.01)
*G06F 3/12* (2006.01)
(52) U.S. Cl.
CPC ............. *G03G 2215/00822* (2013.01); *G03G 2215/0177* (2013.01)

(56) References Cited

U.S. PATENT DOCUMENTS

| | | | | |
|---|---|---|---|---|
| 6,391,132 B1* | 5/2002 | Kinnemann | ............... | B65C 1/02 |
| | | | | 156/256 |
| 9,695,006 B1* | 7/2017 | Yoshidome | ............ | B65H 39/10 |
| 2005/0000842 A1 | 1/2005 | Timmerman et al. | | |

* cited by examiner

IMAGE FORMING APPARATUS WITH A FINISHER TO APPLY A NOTE ONTO A PRINTED PAGE

CROSS-REFERENCE TO RELATED APPLICATION

This application is a continuation of and claims the benefit of priority from U.S. patent application Ser. No. 15/087,988, filed Mar. 31, 2016, which is hereby incorporated herein by reference in its entirety.

BACKGROUND OF THE INVENTION

1. Field of the Invention

The present invention relates to an image forming apparatus such as a copy machine, a printer, facsimile machine, Multi-Function Peripheral (MFP), or other such apparatus.

2. Description of the Related Art

Occasionally, there is a need for a user of an image forming apparatus to attach notes to a printed document. After the printing of a document is complete, the user typically has to manually affix a sheet with handwritten notes onto the document. Such a sheet could take the form of a note with a self-adhesive strip thereon, such as a POST-IT® note. It would be beneficial to provide an image forming apparatus that receives content (e.g. text) for the note, prints the content upon the sheet, cuts the sheet to the desired size, and then adheres the note on a printed document.

SUMMARY OF THE INVENTION

In accordance with various embodiments of the invention, a finishing unit, an image forming apparatus, and a method are provided.

A finishing unit, according to one embodiment of the invention, for applying a note onto a printed document that exits from an image forming apparatus, includes a note cutting unit for cutting a sheet of paper to a note of a desired size and a note pasting unit for applying the note onto the printed document that exits from the image forming apparatus.

According to another embodiment of the invention, an image forming apparatus includes an image forming unit including at least one of a scanning unit, a copying unit, and a printing unit. The image forming apparatus also includes a finishing unit including a note cutting unit for cutting paper into a note of a desired size; and a note pasting unit for applying the note onto the printed document.

In accordance with yet another embodiment of the invention, a method of applying a note onto a printed document includes receiving a user selection of a note attribute associated with a print job, printing, on an image forming apparatus, at least a portion of a print job; printing, on the image forming apparatus, a note; cutting, at a note cutting unit of the image forming apparatus, the note; and pasting, at a note pasting unit of the image forming apparatus, the note, wherein at least one of the printing, cutting, and pasting is according to the note attribute.

These as well as other aspects, advantages, and alternatives will become apparent to those of ordinary skill in the art by reading the following detailed description with reference where appropriate to the accompanying drawings.

Further, it should be understood that the description provided in this summary section and elsewhere in this document is intended to illustrate the claimed subject matter by way of example and not by way of limitation.

DETAILED DESCRIPTION

Figure 1:
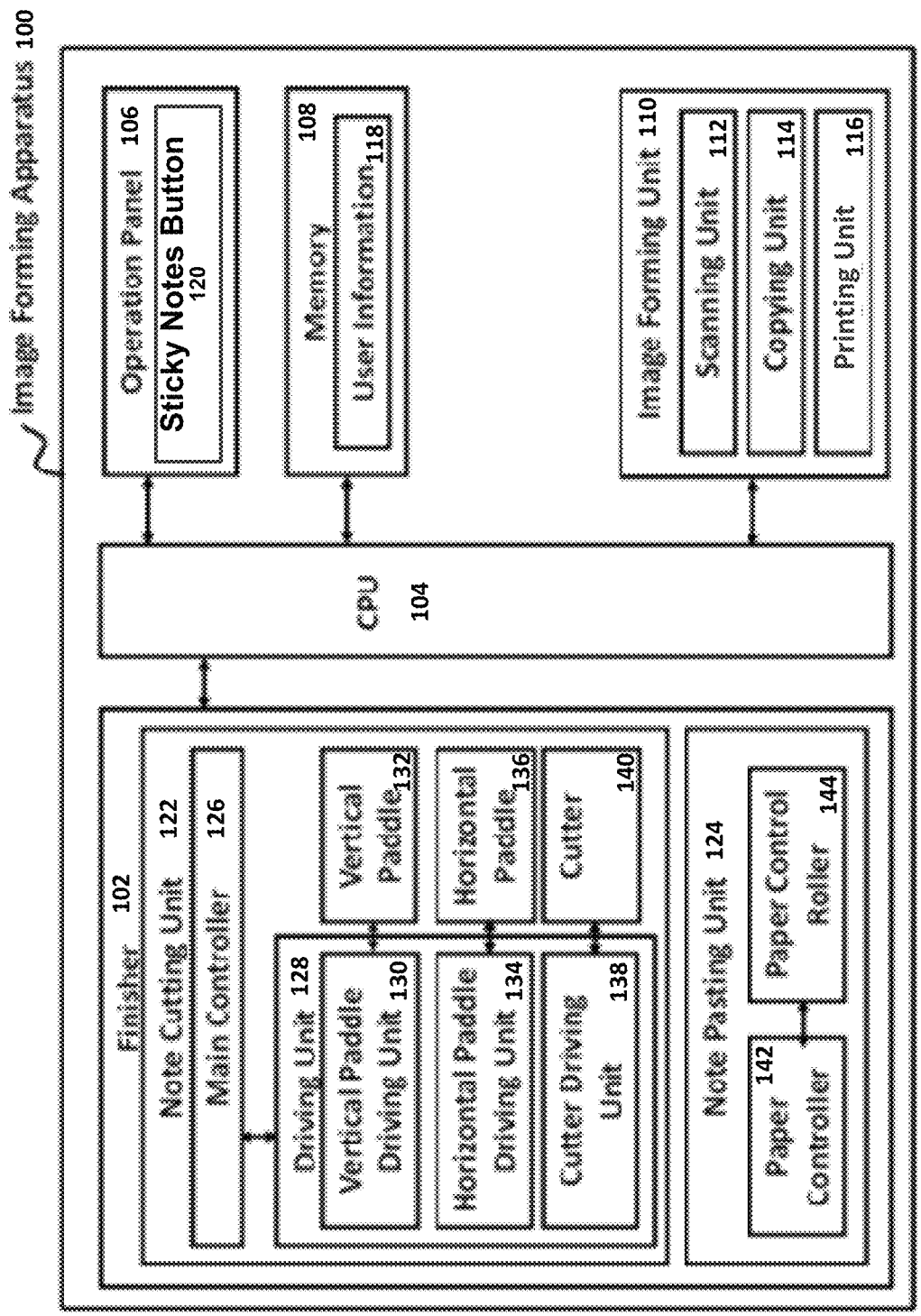
FIG. 1 is a block diagram illustrating an image forming apparatus, according to one embodiment of the present invention.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

1. Example Image Forming Apparatus Structure

Figure 2:
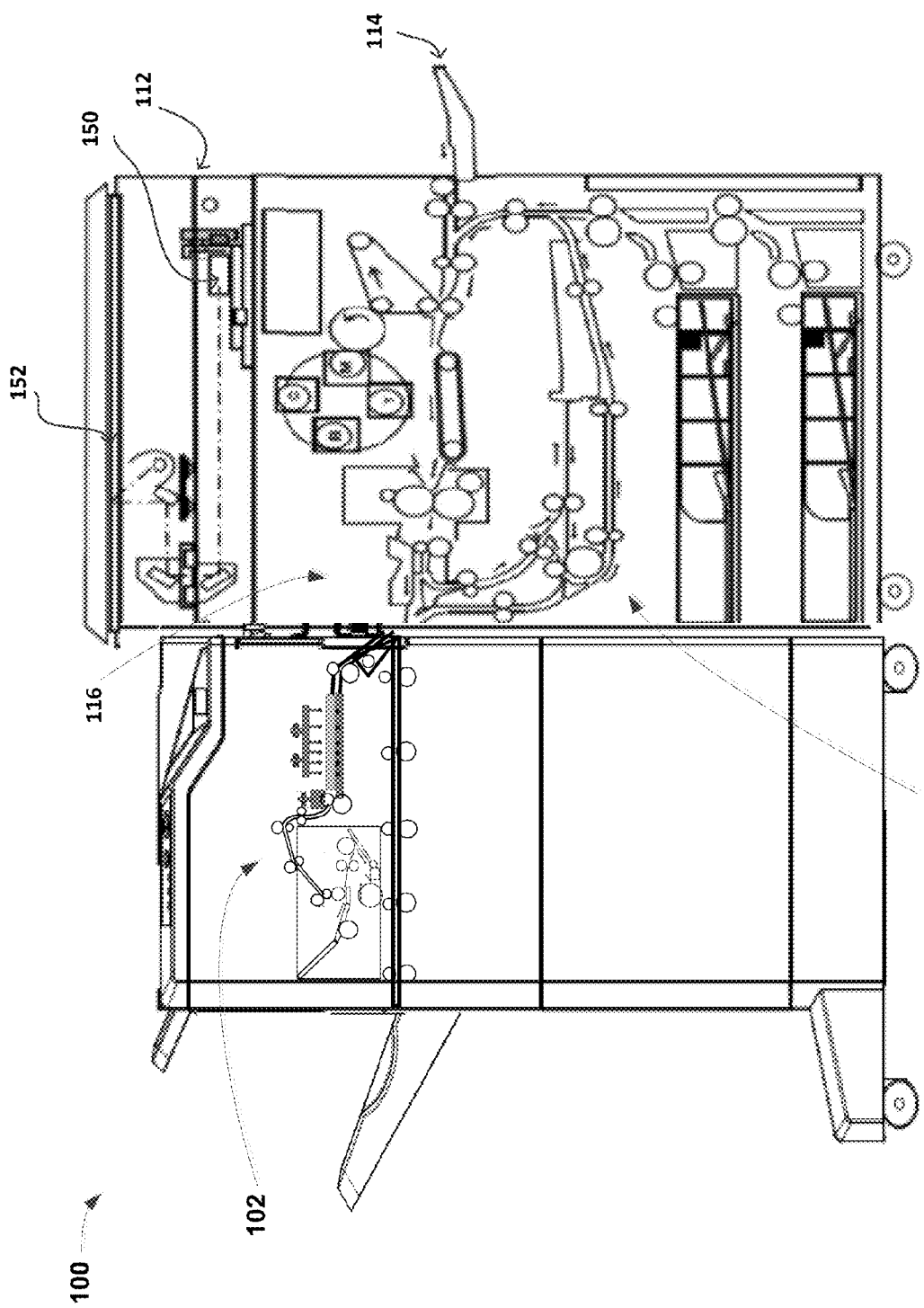
FIG. 2 is a conceptual cross-sectional diagram illustrating an example internal structure of an image forming apparatus, including a finishing unit, according to an embodiment of the present invention.

FIG. 1 is a block diagram of an image forming apparatus 100 in accordance with an embodiment of the present invention. FIG. 2 is a diagram conceptually illustrating an example internal structure of the image forming apparatus 100. These components of the image forming apparatus 100 will be described with reference to FIGS. 1 and 2 and other figures, for which like reference numerals denote like components, unless otherwise stated.

The image forming apparatus 100 includes a finishing unit 102 (also referred to as a "finisher" herein), a Central Processing Unit (CPU) 104, an operation panel 106, a memory 108, and an image forming unit 110. With the exception of the finishing unit 102, most components of the image forming apparatus 100 are of conventional design and operation, according to an embodiment of the invention, and are described first, below. The present invention could be utilized with an image forming apparatus having a different configuration than that shown in FIGS. 1 and 2.

The CPU 104 is a processor, computer, microcontroller, or other circuitry that controls and/or coordinates the operations of the image forming apparatus 100. The CPU 104 may execute software, firmware, and/or other instructions, for example, that are stored on a volatile or non-volatile memory, such as the memory 108, or otherwise provided to the CPU 104. CPU 104 may be connected to other components of the image forming unit 110 through wired or wireless connections, such as one or more system buses, cables, or other interfaces. Like other components of the image forming apparatus 100, the CPU 104 is powered by a power source, such as DC power converted and conditioned by an AC power supply.

The operation panel 106 is a user interface for the image forming apparatus 100 and may take the form of a physical keypad or touchscreen, for example. The operation panel 106 may receive inputs from one or more users relating to selected functions, preferences, and/or authentication, for example, and may provide and/or receive inputs visually and/or audibly, for example. In the example illustrated in FIG. 1, sticky note button 120 is shown as one example of what the operation panel 106 may include.

The memory 108, in addition to storing instructions and/or data for use by the CPU 104 in managing operation of the image forming apparatus 100, may also include user information 118 associated with one or more users of the image forming apparatus 100. For example, the user information 118 may include authentication information (e.g. username/password pairs), user preferences, and other user-specific information. In addition, the memory may store data relating to a note to be applied to a printed page. Such data could include note dimensions, color, content (e.g. text), placement location, and/or other parameters. The CPU 104 may access this data to assist in providing control functions (e.g. transmitting and/or receiving one or more control signals) related to operation of the finisher 102.

The image forming unit 110 in the image forming apparatus 100 includes a scanning unit 112, a copying unit 114, and a printing unit 116. While not every image forming apparatus provides scanning, copying, and printing functions, these functions are provided by most Multi-Function Peripherals (MFPs), so the example described herein utilizes an image forming apparatus 100 providing these same functions. Other functions, such as facsimile functions, may also be included, and one or more functions may be excluded, as well.

The scanning unit 112 irradiates light from a light source 150 onto a document placed on a platen glass 152, optically reads the document based on the reflected light, and converts the optical image into an electric signal, thereby generating image data.

The copying unit 114 typically includes a charge-eliminating device that eliminates a remnant change on a surface of a photosensitive drum; a charging device that then charges the surface of the photosensitive drum; an exposing device that exposes the surface of the photosensitive drum with laser light output in a manner corresponding to image data acquired by the scanning unit 112, and forms electrostatic latent images on the surface of the photosensitive drum; developing devices that then form toner images of respective colors including cyan (C), magenta (M), yellow (Y), and black (K), on the photosensitive drum on the basis of the electrostatic latent images; a transfer drum that then receives the toner images of the respective colors formed on the photosensitive drum so that the toner images are superposed on one another on the transfer drum; a transferring device (not shown) that transfers the toner images on the transfer drum onto a sheet; and toners of respective colors that are supplied from toner supply containers.

After exiting the copying unit 114, the sheet of paper is conveyed along a main conveyance path to the printing unit 116. The printing unit 116 includes a combination of rollers, belts, and the like, and is provided with a heat source such as a halogen heater, for example. Using heat and pressure, the printing unit 116 fuses and fixes the toner on the sheet, to which the toner image has been transferred by the copying unit 114. The sheet is then ready to exit the image forming apparatus 100 into the finishing unit 102. If images are to be printed on both sides of the sheet, the CPU 104 then directs the sheet through a secondary conveyance path 154 such that the images are placed on the other side of the sheet. The sheet then is directed to the finishing unit 102.

The finishing unit 102 is configured to place notes on a printed document received from the image forming unit 110 of the image forming apparatus 100. The finishing unit 102 includes a note cutting unit 122 and a note pasting unit 124. As mentioned above, although the finishing unit 102 is shown in connection with the image forming apparatus 100 having the configurations shown in FIGS. 1 and 2, the finishing unit 102 could be used with an image forming apparatus having another configuration.

The note cutting unit 122 includes a main controller 126, a driving unit 128, a vertical paddle driving unit 130, a vertical paddle 132, a horizontal paddle driving unit 134, a horizontal paddle 136, a cutter driving unit 138, and a cutter 140. The note pasting unit 124 includes a paper controller 142, and a paper control roller 144. Further details regarding these components are described with respect to subsequent figures herein. Generally, in the note cutting unit 122 of the finishing unit 102, the paper (or other medium) is cut in accordance with a selected note size that is input by the user, as described in further detail below. If content (e.g. text) is to be included on the note, that content is preferably printed on the note using the image forming unit 110 of the image forming apparatus 100, prior to being conveyed to the note cutting unit 120.

2. Example Structure and Operation of the Note Cutting Unit 122

Figure 5:
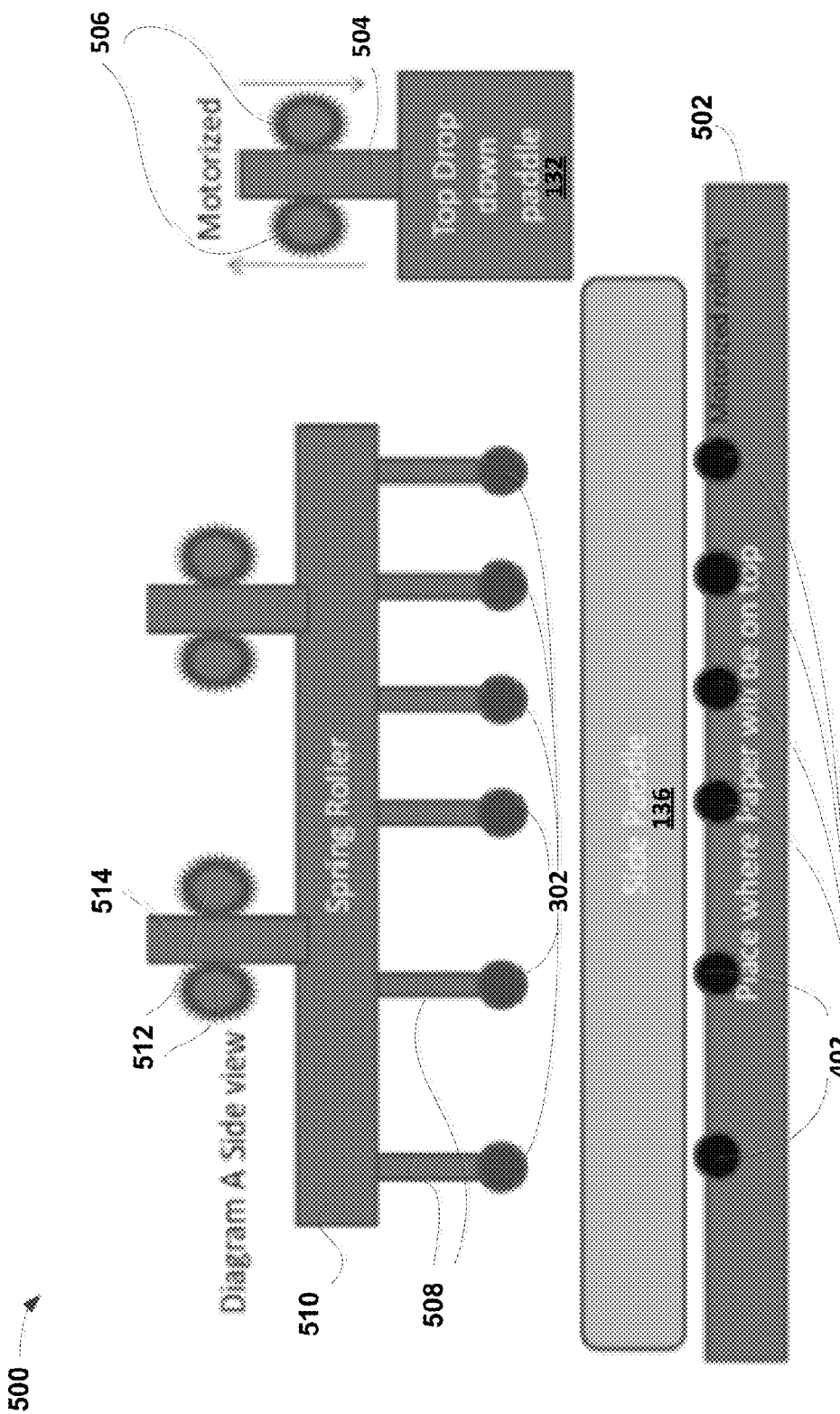
FIG. 5 is a schematic side view diagram of a paper alignment portion of a note cutting unit, according to one embodiment of the present invention.
Figure 6:
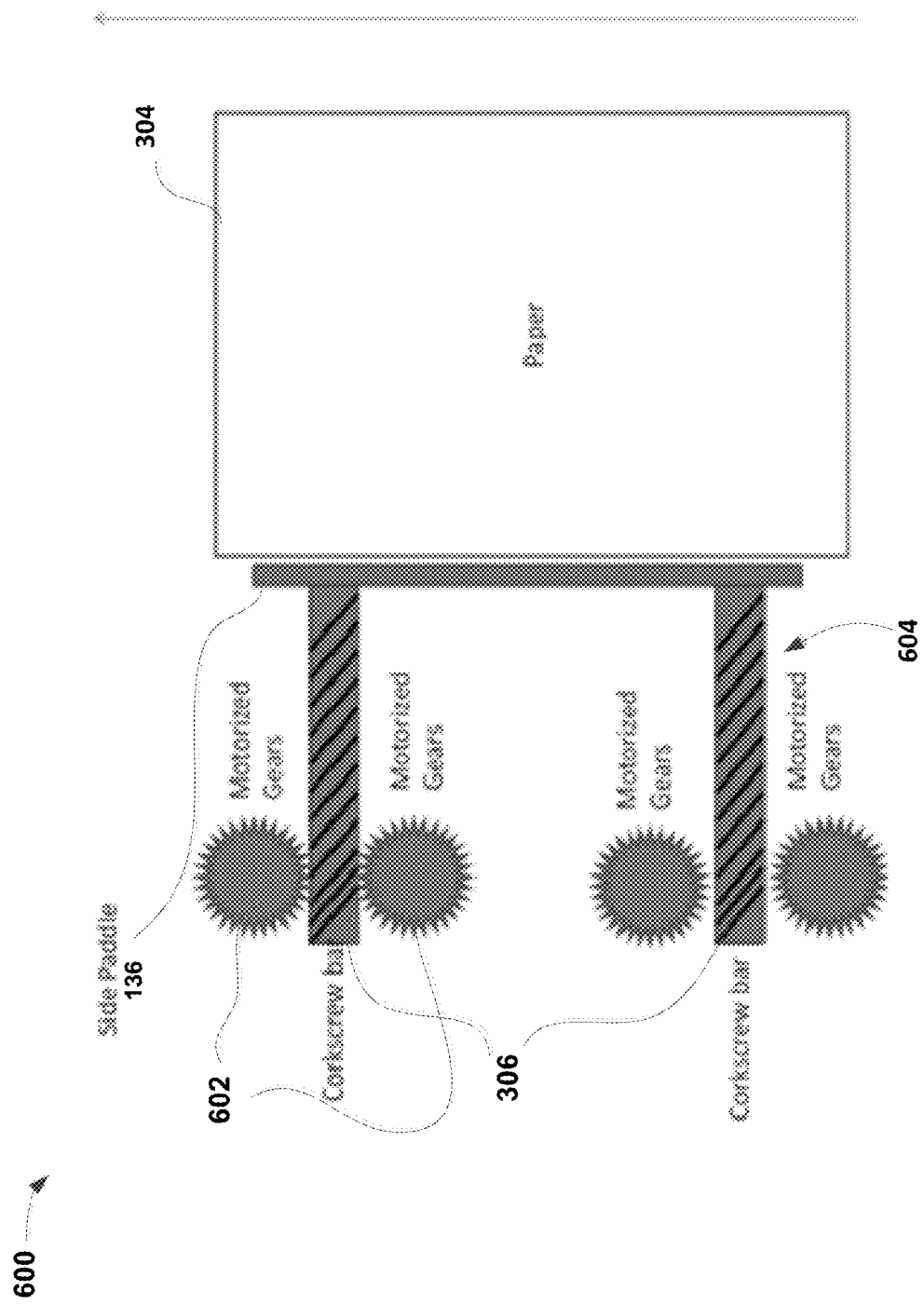
FIG. 6 is a is a schematic overhead view diagram of a side paddle arrangement, according to one embodiment of the present invention.
Figure 7:
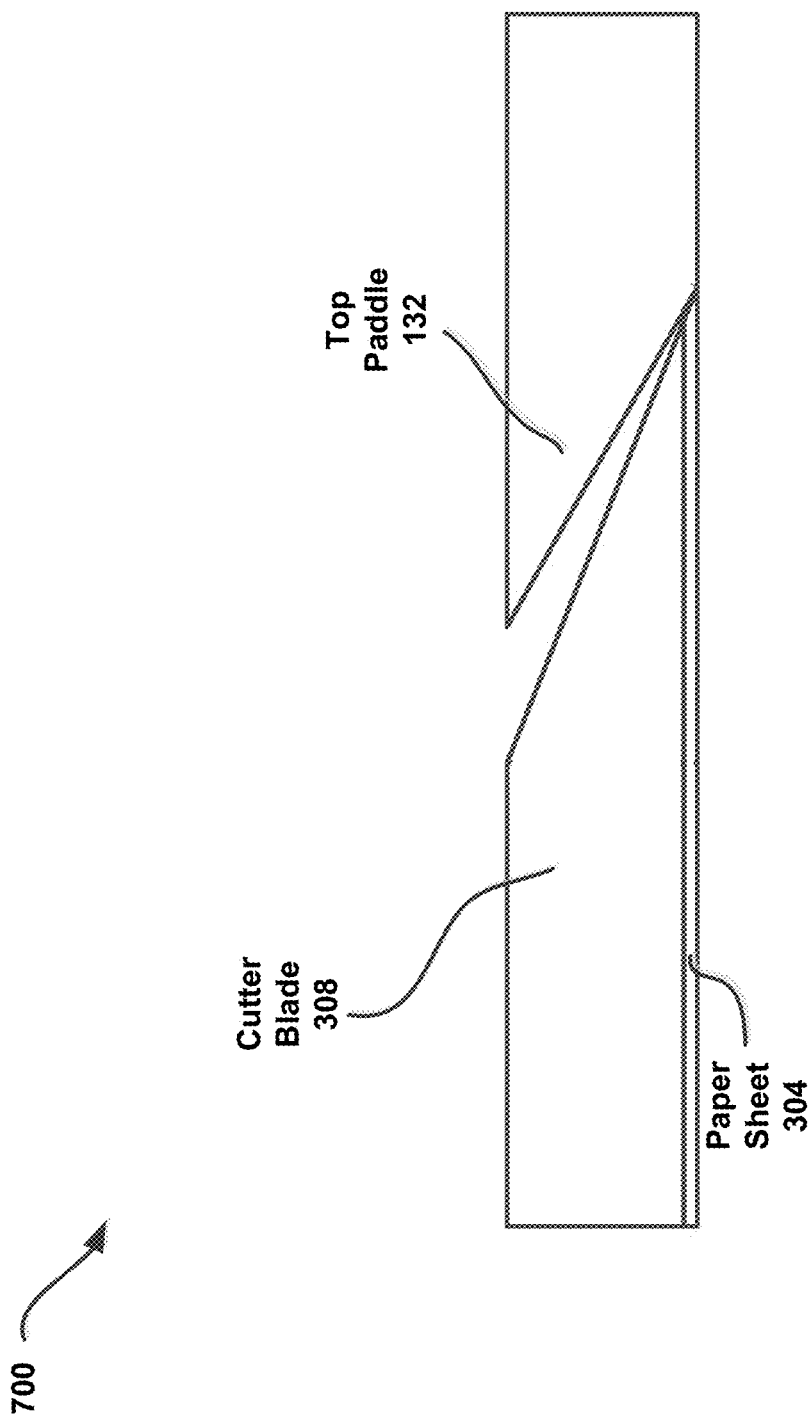
FIG. 7 is a schematic side view diagram of an interface between a notched version of the top paddle, a cutter blade, and a sheet of paper, according to one embodiment of the present invention.

As described above with respect to FIG. 1, the note cutting unit 122 includes a main controller 126, a driving unit 128 (comprising vertical paddle driving unit 130, horizontal paddle driving unit 134, and cutter driving unit 138), and a number of "driven" units (vertical paddle 132, horizontal paddle 136, and cutter 140). For the following description, FIGS. 3-6 are primarily directed to the structure and operation of the vertical paddle 132 and horizontal paddle 136; FIG. 7 is directed to the interface between the vertical paddle 132 and the cutter 140; and FIGS. 8-13 are primarily directed to the structure and operation of the cutter 140. Subsequent figures relate to the note pasting unit 124, user interfaces, and a method of applying a note, respectively.

Figures 3, 4:
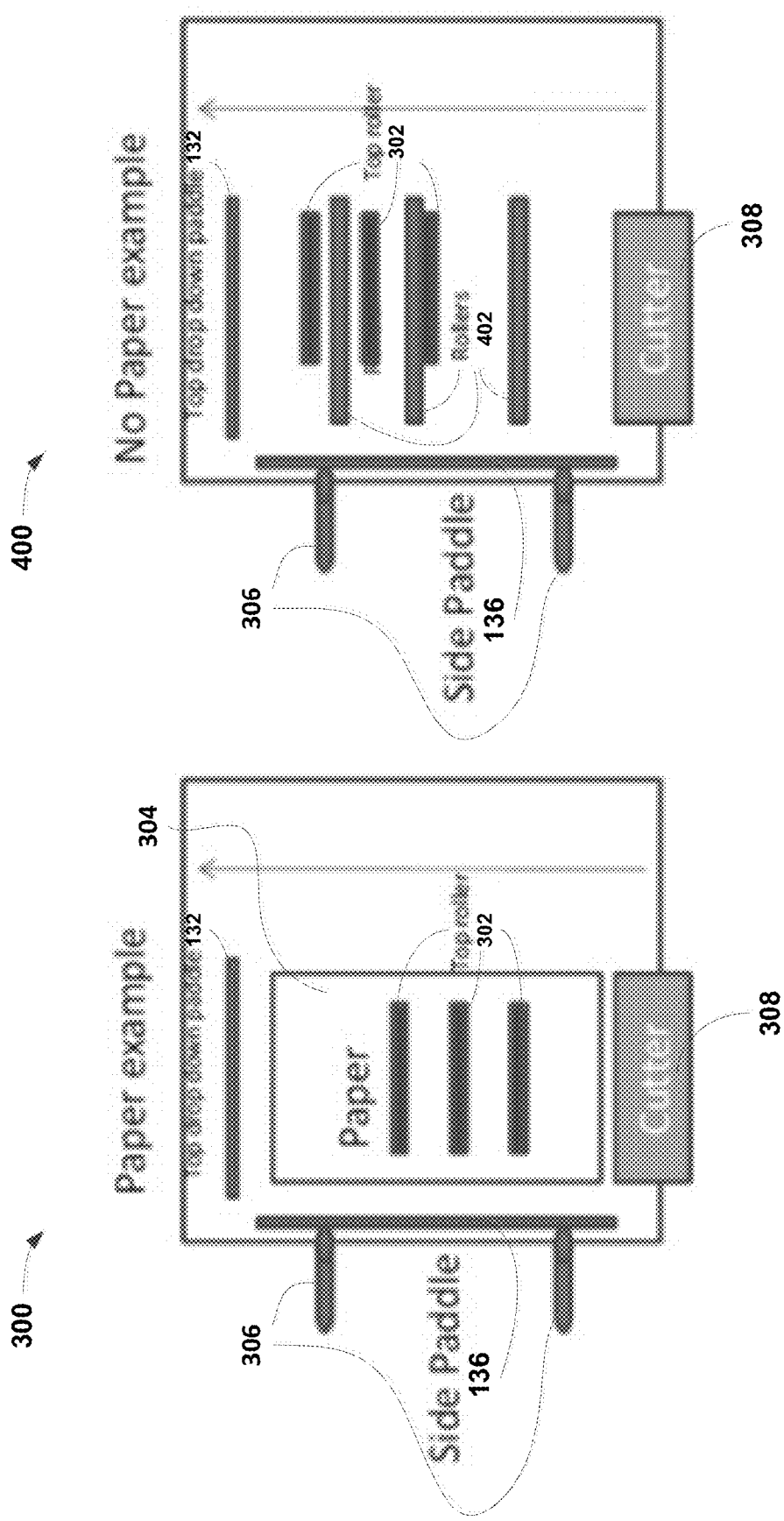
FIG. 3 is a schematic overhead view diagram of a paper alignment portion of a note cutting unit of the finishing unit, with paper shown, according to one embodiment of the present invention.
FIG. 4 is a schematic overhead view diagram of a paper alignment portion of a note cutting unit, without paper shown, according to one embodiment of the present invention.

FIG. 3 is a schematic overhead view diagram of a paper alignment portion 300 of the note cutting unit 122 of the finishing unit 102, with paper 304 shown, according to one embodiment of the present invention. FIG. 4 is a schematic overhead view diagram of a paper alignment portion 400 of a note cutting unit 122, without paper shown, according to one embodiment of the present invention. FIG. 5 is a schematic side view diagram of a paper alignment portion 500 of a note cutting unit 122, according to one embodiment of the present invention. FIG. 6 is a schematic overhead view diagram of a side paddle arrangement 600, according to one embodiment of the present invention. The following discussion references each of FIGS. 3-6, as well as previously described figures, to describe how a sheet of paper is aligned for cutting by the note cutting unit 122 (with the cutter blade shown generally as 308).

Motorized (driving) rollers 402 act to convey a paper to the note cutting unit 122. A plurality of non-motorized (driven) spring-loaded top rollers 302 overlay a sheet of paper 304 and serve to apply slight pressure to the sheet of paper 304 to sandwich the sheet of paper 304 between the driving rollers 402 and the driven rollers 302. The paper is carried on top of the driving rollers 402 from the printing unit 116 of the image forming apparatus 100. Once the sheet of paper 304 enters the note cutting unit 122, the side or horizontal paddle 136 acts on the sheet of paper 304 to keep it in the proper orientation, straight along the length of the paper, parallel to the direction of travel, which is indicated by the upward pointing arrow in FIGS. 3 and 4. Once the cutting is complete and the resulting note is driven to the finisher, the horizontal paddle acts to push any remaining paper into a waste or recycling receptacle, according to one embodiment. The horizontal paddle 136 preferably comprises a substantially flat surface for acting along the entire side of the paper. In one embodiment, the horizontal paddle 136 takes the shape of an elongated rectangle. The horizontal paddle 136 may take other shapes.

The horizontal paddle driving unit 134 (shown in detail in FIG. 6) comprises at least one corkscrew mechanism or bar 306 mounted opposite the surface of the paddle 136 and extending perpendicularly therefrom, and at least one set of motorized gears 602 that cooperates with the corkscrew mechanism or bar 306 for moving the horizontal paddle 136 towards or away from the sheet of paper 304. As is conventional, the gears 602 travel along the serrated outer surface of the corkscrew mechanism or bar 306, thereby causing the paddle 136 to move. As can be seen in FIG. 6, the horizontal paddle driving unit may be provided with two sets of motorized gears 602, each cooperating with a respective corkscrew bar 306 for moving the horizontal paddle 136. Additional sets of motorized gears and corresponding corkscrew bars may be provided, as appropriate. If the horizontal paddle 136 is provided with one set of motorized gears 602 cooperating with a respective corkscrew bar 306, then the corkscrew bar is mounted toward the center of the horizontal paddle 136. If the horizontal paddle 136 is provided with two sets of motorized gears 602, then respective corkscrew bars 306 are mounted near opposite ends of the paddle 136.

The note cutting unit 122 may further include a top or vertical paddle 132 (shown in detail in FIG. 5) that functions to help align the paper 304 in a vertical direction to keep the paper 304 in the proper orientation, straight along the width of the paper 304. This results in a small amount (e.g. around 1 mm) of the paper 304 being sandwiched between the top paddle 132 and a cutting surface 502 underlying the paper 304. The top or vertical paddle 132 comprises a flat or notched (See FIG. 7) surface that acts on the top surface of the paper 304, a corkscrew bar 504 mounted to a surface opposite the paper 304 and extending perpendicularly therefrom, and at least one set of motorized gears 506 that cooperates with the corkscrew bar 504 for moving the vertical paddle 132 towards or away from the paper 304. The top or vertical paddle 132 may also be referred to as a top drop down paddle as it drops down onto the sheet from an upward direction (i.e. from a direction z orthogonal to the horizontal direction x and a vertical direction y, both horizontal x and vertical y directions being in an x-y plane of the paper 304 to be cut) when in an extended position. The vertical paddle 132 also has a retracted position, in which it is retracted upwardly, away from the paper 304.

As set forth above, the note cutting unit 122 further includes a plurality of spring rollers 302 having a retracted position (away from the paper 304) and an extended position (toward the paper 304). The spring rollers 302 are moved between the two positions by the action of at least one set of motorized gears 512 that cooperates with at least one respective corkscrew bar 514. In the retracted position, the spring rollers 302 are retracted away from the bottom rollers 402 and the paper 304. In this position, with the spring rollers 302 out of the way, the cutter 140 can be used to cut the paper 304 to the desired size. In the extended position, the spring rollers 302 have been moved downwardly to contact the upward-facing surface of the paper 304, thereby trapping the paper 304 between the spring rollers 302 and the motorized rollers 402. In this position, the spring rollers 302, powered by the motive force of the motorized rollers 402, can guide the paper 304 through the note cutting unit 122 so that it does not get dislocated before and after being cut. As illustrated in FIG. 5, the spring rollers 302 can be supported by a spring roller support 510 with spring-loaded support arms 508.

FIG. 7 is a schematic side view diagram of an interface between a notched version of the top paddle 132, a cutter blade 308, and a sheet of paper 304, according to one embodiment of the present invention. As illustrated, the notched shape of the surface of the top paddle 132 facing toward the paper 304 serves to "trap" the paper 304 for more secure cutting by the cutter blade 308. The top paddle 132 and cutter blade 308 cooperate to essentially form a nip that prevents the paper 304 from easily moving.

Figure 8:
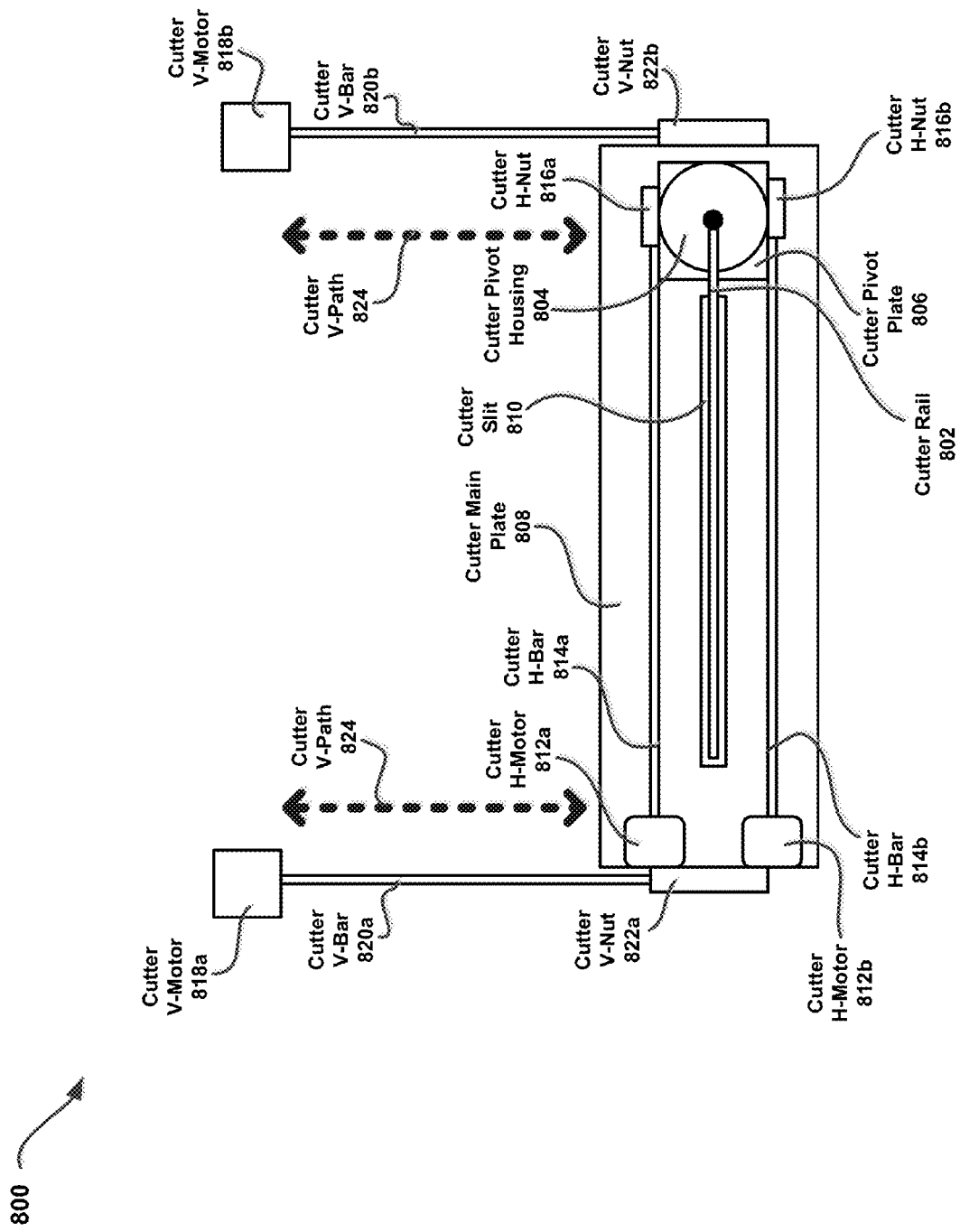
FIG. 8 is a schematic overhead view diagram of a cutter portion of a note cutting unit, illustrating a vertical movement path, according to one embodiment of the present invention.
Figure 9:
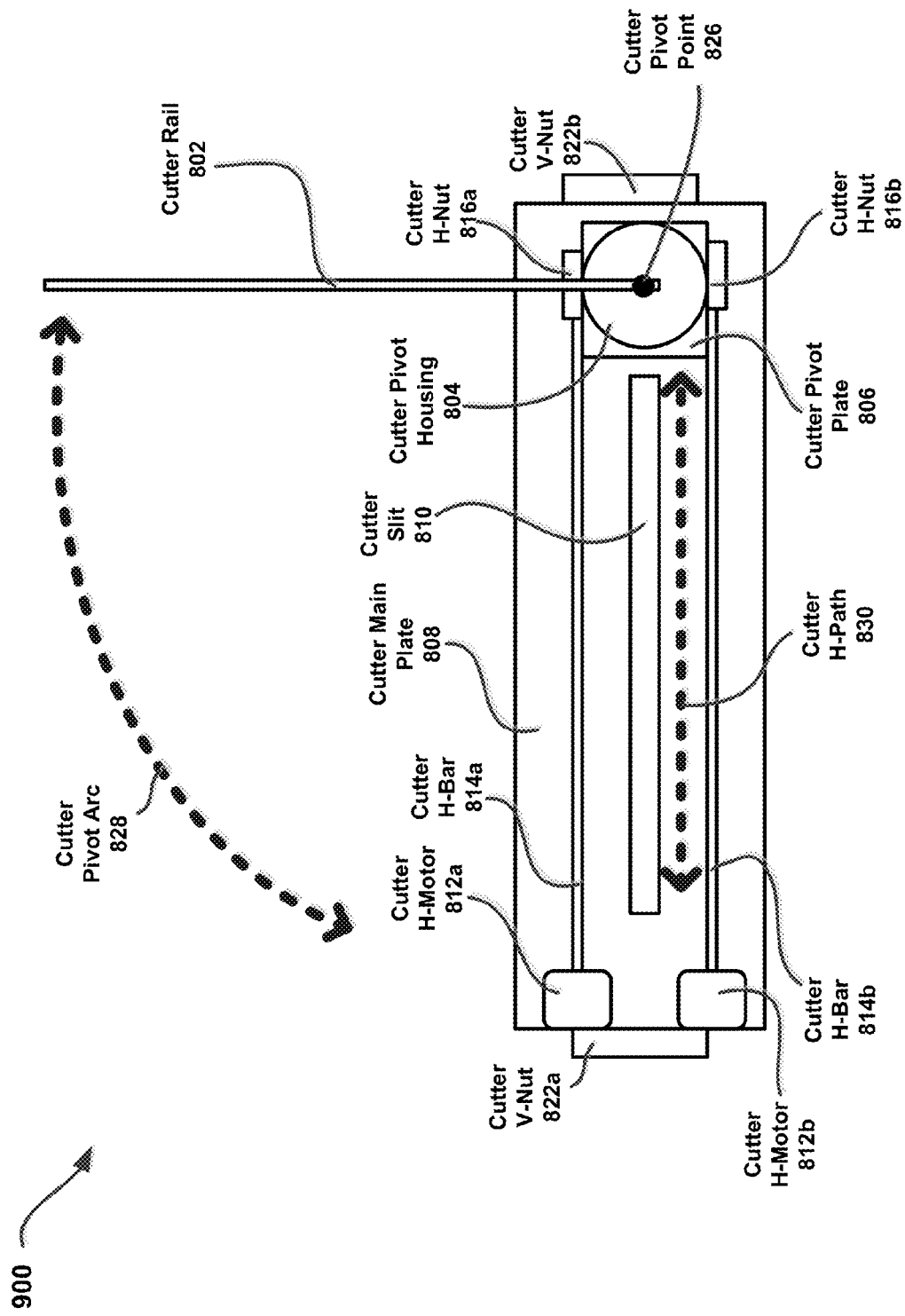
FIG. 9 is a schematic overhead view diagram of a cutter portion of a note cutting unit, illustrating a cutter pivot arc and a horizontal movement path, according to one embodiment of the present invention.
Figure 10:
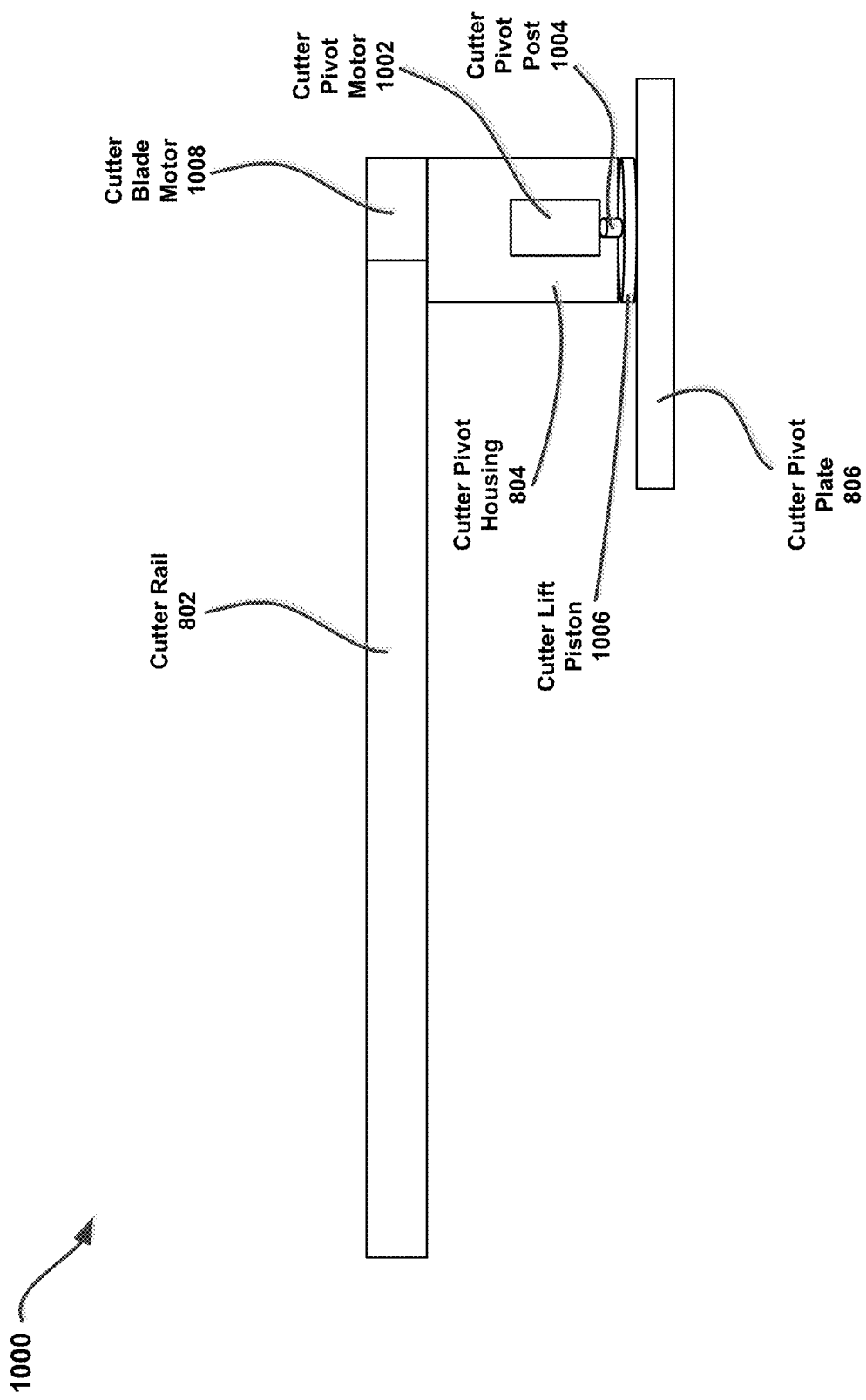
FIG. 10 is a schematic side view diagram of a pivoting cutter mechanism in a cutter portion of a note cutting unit, according to one embodiment of the present invention.
Figure 11:
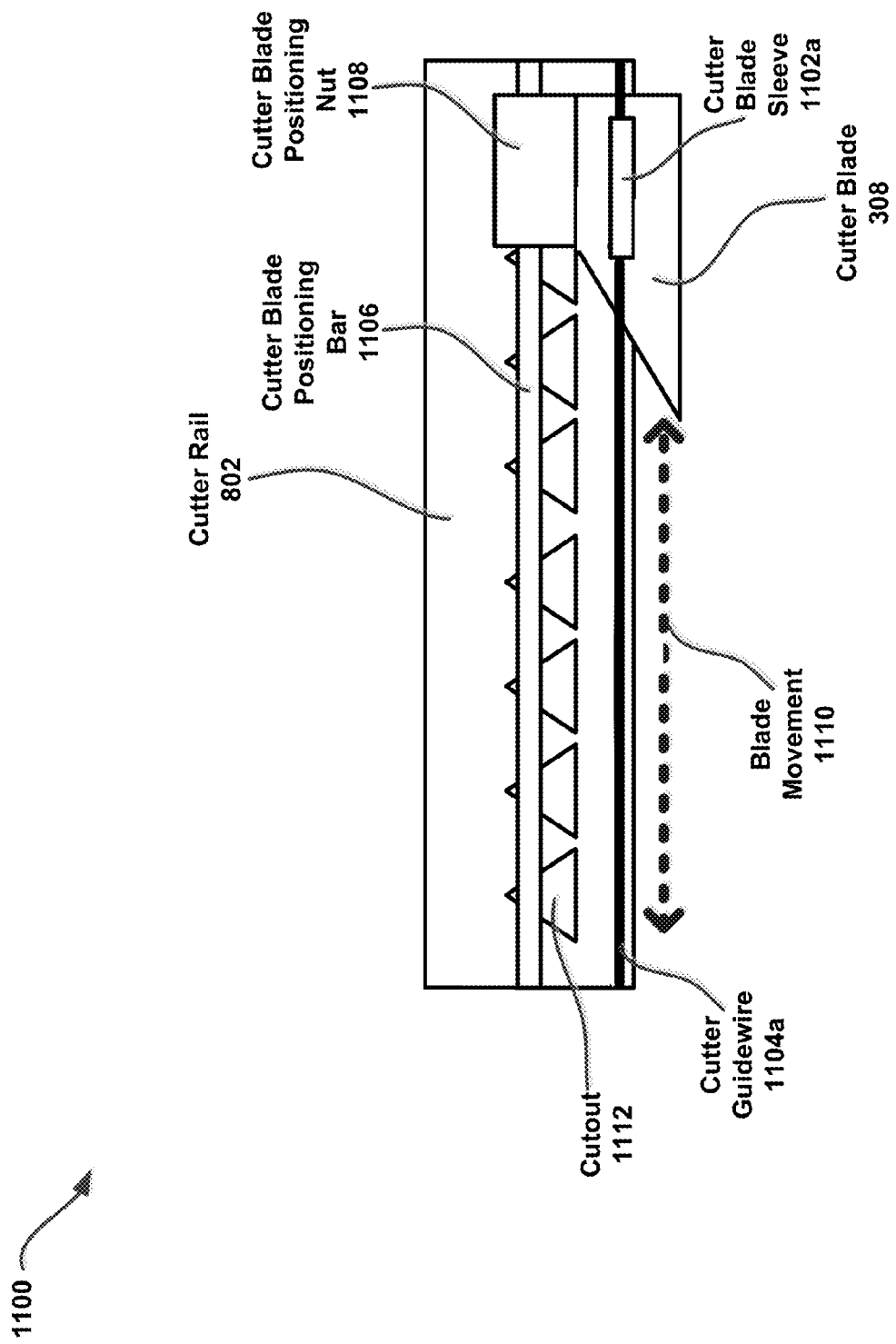
FIG. 11 is a schematic side view diagram of a portion of a cutter mechanism, illustrating movement of a cutter blade along a cutter rail, according to one embodiment of the present invention.
Figure 12:
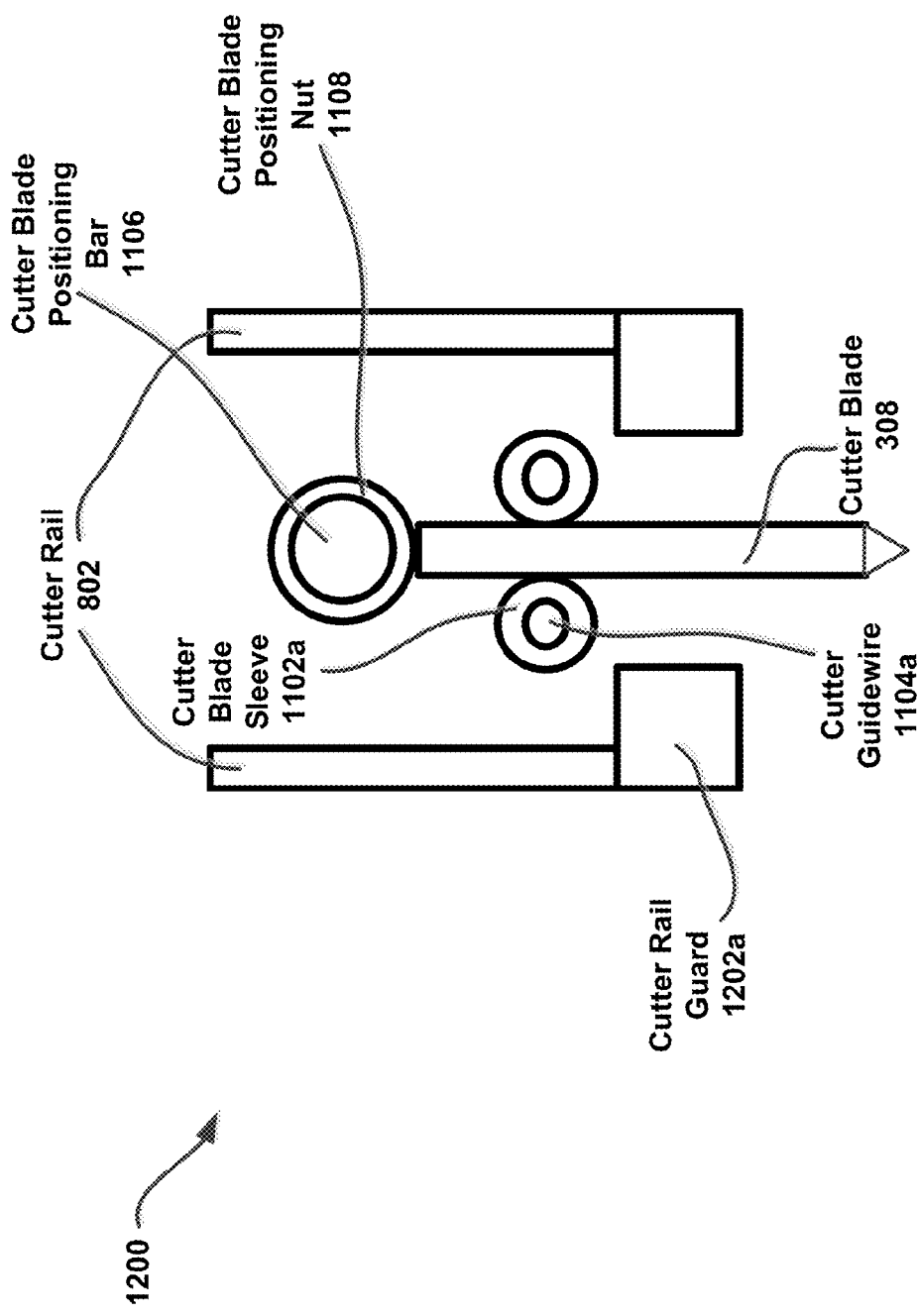
FIG. 12 is a schematic head-on (plan) view diagram of a portion of a cutter mechanism, according to one embodiment of the present invention.

The configuration and operation of the vertical paddle 132 and horizontal paddle 136 and associated driving units 130 and 132 perform an initial aligning function, before cutting by the cutter 140. FIGS. 8-13 will now be described, which are primarily directed to the structure and operation of the cutter 140. FIG. 8 is a schematic overhead view diagram of a cutter portion 800 of a note cutting unit, illustrating a vertical movement path 824, according to one embodiment of the present invention. FIG. 9 is a schematic overhead view diagram of a cutter portion 900 of a note cutting unit, illustrating a cutter pivot arc 828 and a horizontal movement path 830, according to one embodiment of the present invention. FIG. 10 is a schematic side view diagram of a pivoting cutter mechanism 1000 in a cutter portion of a note cutting unit, according to one embodiment of the present invention. FIG. 11 is a schematic side view diagram of a portion 1100 of a cutter mechanism, illustrating movement 1110 of a cutter blade 308 along a cutter rail 802, according to one embodiment of the present invention. FIG. 12 is a schematic head-on (plan) view diagram of a portion of a cutter mechanism 1200, according to one embodiment of the present invention. In FIGS. 8-12, like reference numerals generally denote similar or identical structure and/or function. Reference is additionally made to previously described figures, as appropriate.

The cutter portion 800 of FIG. 8 is aligned with the paper alignment portion 300 shown in FIG. 3 (but not shown in FIG. 8, for ease of illustration) to enable the cutter portion 800 to make horizontal and vertical cuts to the paper 304. (The cutter portion 900 of FIG. 9 is identical, but with the cutter rail 802 pivoted.) The cutter portion 800 comprises a cutter rail 802 that generally includes a cutter blade 308, a threaded bar 1106, cutter blade positioning nut 1108, cutter guidewires 1104a, and cutter blade sleeves 1102a, all of which are shown in FIGS. 11 and 12, but omitted from FIGS. 8-10 for clarity and ease of illustration. The cutter rail 802 is preferably coupled to a cutter pivot housing 804, along with a cutter blade motor 1008, cutter pivot motor 1002, and cutter pivot post 1004 that is coupled to a cutter lift piston 1006, all of which are on a cutter pivot plate 806. (See also FIGS. 9 and 10.) For purposes of FIG. 8, no pivoting is shown. Instead, the above-described components move as a cohesive unit with cutter main plate 808 vertically along cutter vertical paths 824, as will be described in detail below, after further structural details of the cutter main plate 808 and movement mechanisms are described.

The cutter main plate 808 includes a cutter slit 810 through which the cutter blade 308 can traverse when cutting the paper 304 in a horizontal direction (along the width of the paper). Affixed toward opposite ends of one longitudinal end of the cutter main plate 808 are two cutter horizontal motors 812a and 812b actuating the cooperative combination of cutter horizontal threaded bars 814a and 814b and cutter horizontal nuts 816a and 816b, all of whose operation will be described in detail with respect to FIG. 9. Also affixed to opposite longitudinal ends of the cutter main plate 808 are cutter vertical nuts 822a and 822b, which are internally threaded and cooperate with cutter vertical threaded bars 820a and 820b to move the cutter main plate 808 vertically (along the cutter vertical path 824) when cutter vertical motors 818a and 818b actuate (rotate) the cutter vertical threaded bars 820a and 820b. The cutter vertical motors 818a and 818b are stationary with respect to the paper 304 (and the fixing unit 102, generally), so that clockwise or counterclockwise rotation of the cutter vertical threaded bars 820a and 820b causes the cutter main plate 808 (and everything on it) to move along the cutter vertical path 824, to enable the cutter rail 802 to be placed relative to the paper 304 for a precisely located horizontal cut along with width of the paper 304, corresponding to a desired size of the note to be cut. The use of threaded bars with internally threaded nuts is an example of a screw threaded conveyor, as used herein. Control of the cutter vertical motors 818a and 818b is provided by the main controller 126 of the note cutting unit 122, using coordinated-based actuation algorithms similar to those used in typical image forming apparatuses for controlling print head location, for example. Other control techniques may also be used in accordance with embodiments of the present invention.

The cutter main plate 808 is preferably only allowed to move in the vertical direction (along the cutter vertical path 824) when the cutter rail 802 is in the horizontal orientation (generally parallel to the cutter slit 810, as shown FIG. 8), to avoid the cutter rail running out of space if the cutter main plate 808 (and cutter rail 802) were to be moved vertically while the cutter rail 802 is in a vertical orientation (generally perpendicular to the cutter slit 810).

FIGS. 9 and 10 illustrate how the cutter rail 802 can be pivoted (rotated) between a vertical position (as shown in FIG. 9) along a cutter pivot arc 828 to a horizontal position (as shown in FIG. 8). During pivoting, the cutter pivot plate 806 and cutter lift piston 1006 are preferably in stationary relative to the cutter main plate 808, although some coordinated movement (horizontal with pivoting) may be possible, if desired and appropriately controlled. When the cutter pivot motor 1002 rotates the cutter pivot post 1004 clockwise or counterclockwise between 0 and 90 degrees (with 0 degrees corresponding to the cutter rail 802 being horizontal and 90 degrees corresponding to the cutter rail 802 being vertical), the cutter pivot housing 804, cutter pivot motor 1002, cutter blade motor 1008, and cutter rail 802 all pivot about (around) a cutter pivot point 826. The cutter pivot post 1004 is preferably a shaft of the cutter pivot motor 1002 and has its end opposite the cutter pivot motor 1002 secured to the cutter lift piston 1006.

The cutter lift piston 1006 serves to lift the cutter pivot post 1004 (and everything above it, including the cutter rail 802 and attached cutter blade 308 (See FIG. 11) to allow the cutter blade 308 to clear the thickness of the cutter main plate 808 when the cutter blade 308 rotates (via the cutter rail 802) from the horizontal orientation (in which the cutter blade 308 is in the cutter slit 810) to the vertical orientation. In addition, the cutter lift piston 1006 is also engaged (lifted up) when the cutter blade 308 rotates (via the cutter rail 802) from the vertical orientation to the horizontal orientation, so that the cutter blade can be placed back in the cutter slit 810. Rotation of the cutter rail 802 (and associated cutting mechanisms thereon) to the vertical position allows for vertical (lengthwise) cuts to the paper 304, once positioned at the desired horizontal position, which will now be described.

Affixed to the cutter main plate 808 are cutter horizontal motors 812a and 812b, whose operation is similar to that of cutter vertical motors 818a and 818b, described above. When the cutter horizontal motors 812a and 812b rotate the cutter horizontal threaded bars 814a and 814b, the cutter horizontal threaded nuts 816a and 816b, which are affixed to the cutter pivot plate 806, cause the cutter pivot plate 806 (and everything mounted to it) to move horizontally along the cutter horizontal path 830. As a result, the cutter rail 802 and its cutting mechanisms are also moved horizontally. Horizontal movement should only be allowed when the cutter rail is not in the horizontal orientation and is preferably in the vertical orientation, to prevent the cutter blade from hitting the left end of the slit (near the cutter horizontal motors 812a and 812b).

FIGS. 11 and 12 illustrates two views 1100 and 1200 of a portion of the cutter mechanism, illustrating a blade movement path 1110 of a cutter blade 308 along a cutter rail 802, according to one embodiment of the present invention. Note that only a portion of the cutter rail 802 is shown, and none of the underlying structure of FIGS. 8-9 is reproduced in FIG. 11, although it would still be present, as implemented. The cutter blade motor 1008 rotates a threaded cutter blade positioning bar 1106 clockwise or counterclockwise to cause the cutter blade positioning nut 1108, which is also inner-threaded, to move inwards or outwards along the blade movement path 1110. Since the cutter blade 308 is attached (e.g. via welding, glue, solder, fastener, or unitary construction, for example) to the cutter blade positioning nut 1108, the cutter blade 308 also moves inwards or outwards along the blade movement path 1110 when the cutter blade motor 1008 rotates the cutter blade positioning bar 1106. Cutter guidewires 1104a preferably span the length of the blade movement path 1110 (e.g. the desired maximum cutting length) and cooperate with cutter blade sleeves 1102a, which are affixed to or part of the cutter blade 308, to provide lateral stability to the cutter blade 308 (i.e. guide and propel) as it moves along the blade movement path 1110. The cutter guidewires 1104a are preferably attached to both sides of the cutter blade 308, essentially straddling the cutter blade positioning bar 1106, and are comprised of 16 or 18 AWG sized wire, according to one embodiment. Also shown are cutter rail guards 1202a at the bottom edges of the cutter rail 802 which serve to protect and provide additional strength and support to the cutter rail 802, if desired. In addition, cutouts 1112 (of any shape) may be utilized as a weight-saving measure, if desired (since the cutter rail 802 is preferably only supported at one end). The cutter blade 308 itself may take the form of a metallic blade or any other suitable form with a cutting edge.

Figure 13:
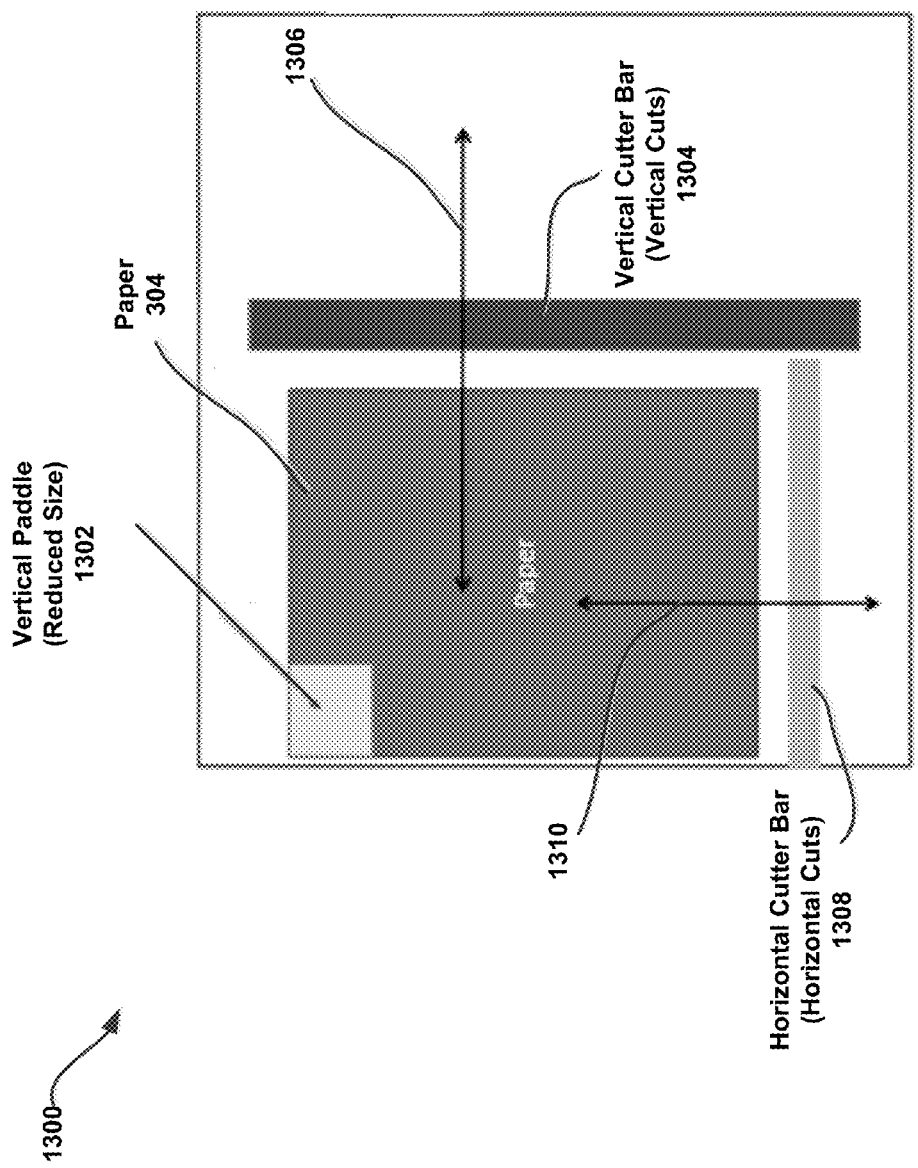
FIG. 13 is a schematic overhead view of an alternative cutter portion of a note cutting unit, utilizing two cutters, according to one embodiment of the present invention

FIG. 13 illustrates an alternative cutter portion 1300 of a note cutting unit, utilizing two cutters, according to one embodiment of the present invention. Rather than a single cutter rail 802 that pivots in order to cut in both the vertical and horizontal directions, the configuration shown in FIG. 13 uses a two separate cutter rails, each with its own motor, threaded bar, and threaded nut assemblies to effect horizontal movement 1306 for vertical cuts using vertical cutter bar 1304 and vertical movement 1310 for horizontal cuts using horizontal cutter bar 1308. For the configuration of FIG. 13, the size (length) of the vertical paddle 1302 is preferably reduced, so that the cutter can achieve a desired minimum cutting dimension. The shorter the top paddle 1302 is, the smaller the minimum achievable size. For example, if the paddle is 4"×4" then the minimum size of the note might be 5"×5". However if the paddle is 3"×3" then it may be possible to reduce the minimum size of the note to 4"×4".

In accordance with the structure set forth above in FIGS. 1-12, the following sequence of operations (i.e. method) is used to control the note cutting unit 122, according to a preferred embodiment:

1. The plurality of the driving and driven rollers will guide the paper onto the cutting surface.
2. The plurality of rollers will then retract (to allow clearance for cutting) and the side paddle will align the paper,
3. The top paddle will then sandwich the paper, and both the side paddle and top paddle will remain temporarily stationary.
4. The cutting rail will rotate from 0 degrees to 90 degrees and move to the left (horizontal direction), and make the cut.
5. The cutting rail will then move to the right, and the rail will rotate back to 0 degrees.
6. The side paddle will then retract, to make room for the cutting rail.
7. The cutting rail will then move up and make the desired cut.
8. The cutting rail will then retract back to the initial position.
9. The top paddle will then retract.
10. The plurality of rollers will then sandwich the paper and then drive the note for pasting to the targeted paper sheet of the print job.
11. The plurality of rollers will stay engaged unless the next job is not a note printing job, at this time the plurality of the rollers will retract.

3. Example Structure and Operation of the Note Pasting Unit 124

Figure 14A:
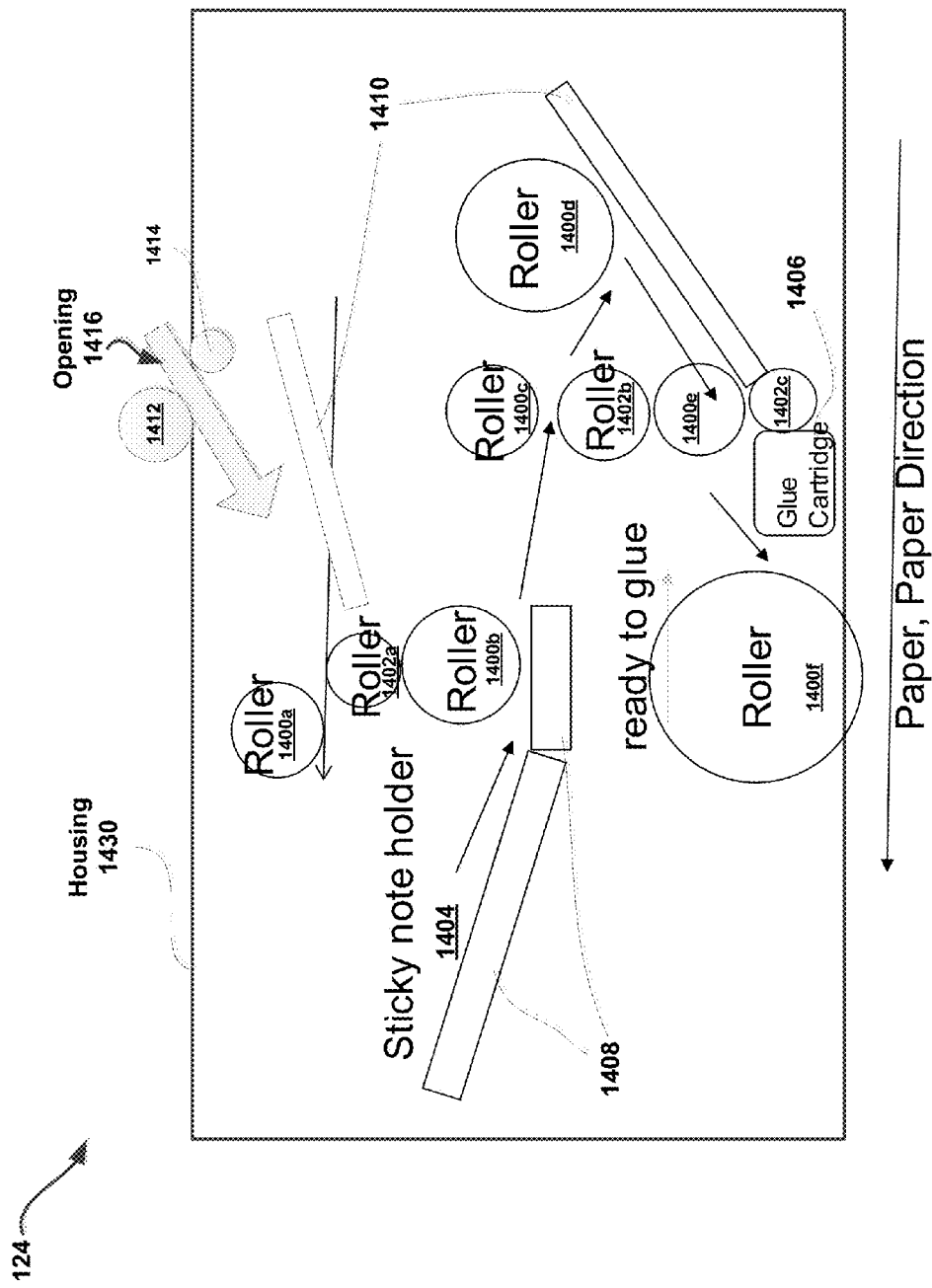
FIG. 14A is a conceptual cross-sectional (side view) diagram of a note pasting unit, according to one embodiment of the present invention.
Figure 14B:
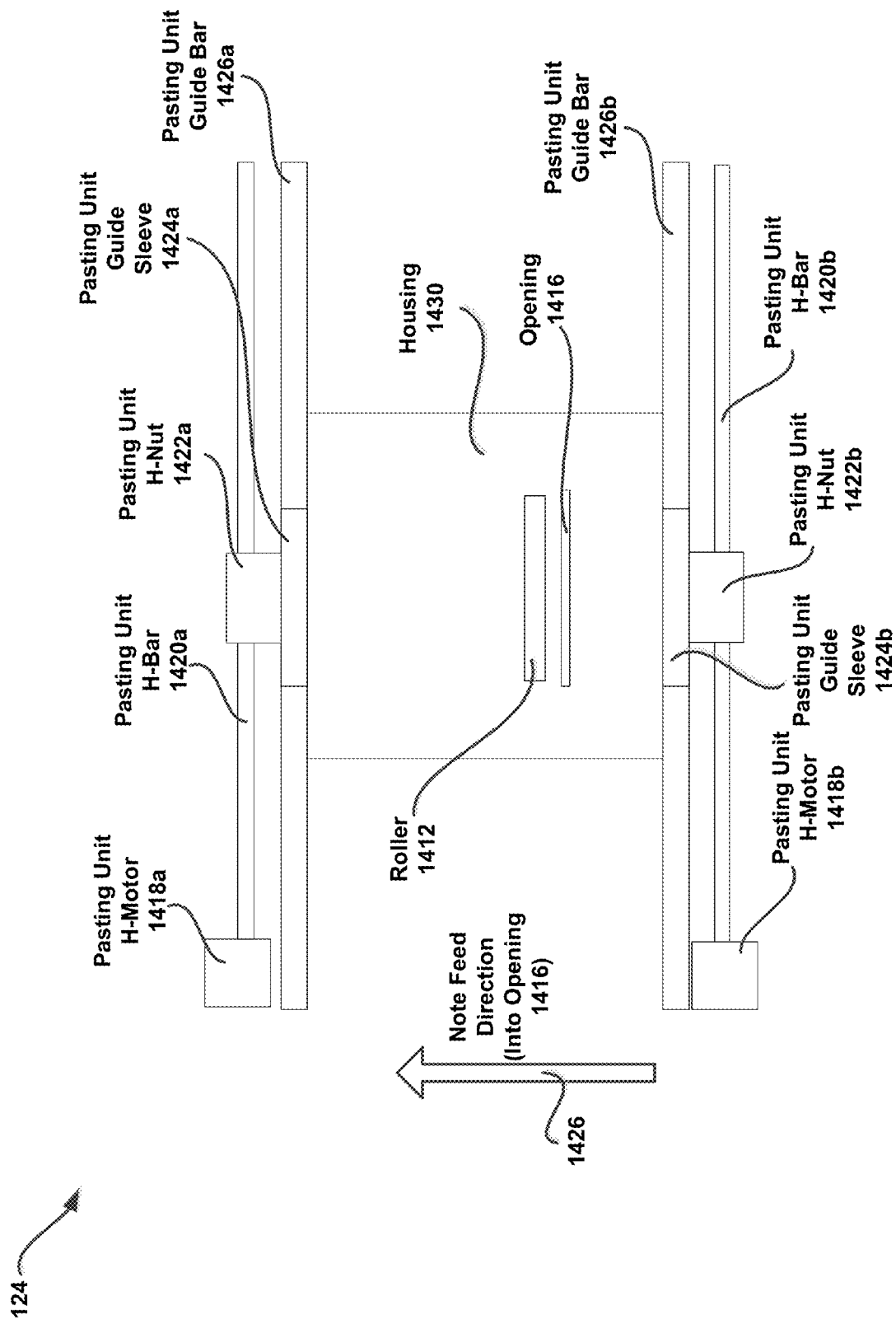
FIG. 14B is a schematic overhead view diagram of a note pasting unit, according to one embodiment of the present invention.
Figure 14C:
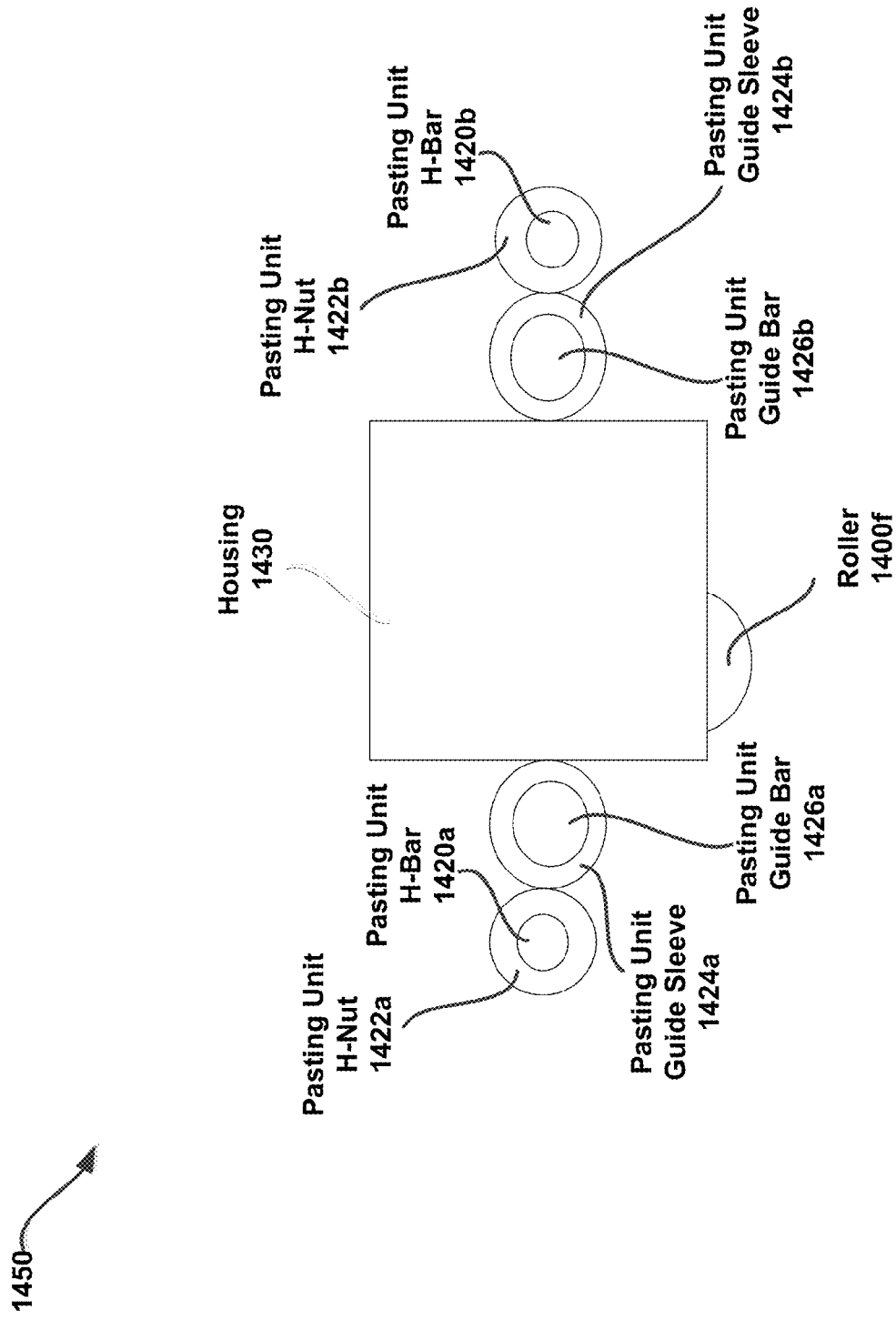
FIG. 14C is a schematic side view (perpendicular to the note feed direction) of a portion of the note pasting unit, according to one embodiment of the present invention.

Once cut to the desired note size, the cut paper is then conveyed by the rollers 302 and 402 to the note pasting unit 124, which is shown schematically in FIGS. 14A-14C. FIG. 14A is a conceptual cross-sectional (side view) diagram and FIG. 14B is a schematic overhead view diagram of the note pasting unit 124, according to one embodiment of the present invention. FIG. 14C is a schematic side view (perpendicular to a note feed direction 1426) of a portion 1450 of the note pasting unit 124, according to one embodiment of the present invention. The following discussion references each of FIGS. 14A-14C, as well as various other figures, in describing the structure and operation of the note pasting unit 124.

The note pasting unit 124 comprises a housing 1430 that is movable in a horizontal direction (in a width-wise direction relative to the sheet of paper 304 from the print job) so that the note that was cut by the note cutting unit 102 can be applied at an appropriate horizontal position on the sheet of paper 304. (Vertical placement of the note is described below, and is achieved using a motorized (driving) roller 1400f.) The housing 1430 substantially houses plurality of driven (non-motorized) rollers 1400a-f, a plurality of driving (motorized) rollers 1402a-c, a note holder 1404, a glue cartridge unit 1406, and a plurality of passing surfaces 1408 and 1410. The passing surfaces 1408 and 1410 are preferably smooth metal, to allow the note to slide with little friction. Housing entrance rollers 1412 (non-motorized, driven) and 1414 (motorized, driven) convey or feed the note (cut by the note cutting unit 102) into an opening 1416 of the housing 1430. A first set of rollers 1400a and 1402a then conveys the note paper to the note holder 1404. The note holder 1404 changes the direction of the feed of the note for proper positioning for gluing. The note paper changes its direction of travel and is directed in a downward direction past a note holder roller 1400b, through a second set of rollers 1400c and 1402b, past a directional roller 1400d.

The roller 1400e positions the note to apply glue or adhesive to a desired portion of the note (i.e. the roller 1400e positions the note for a wider glue strip or narrower glue strip, based on preferences, default setting(s), or manual or automatic adjustments). The paper moves past the glue cartridge 1406, where the glue cartridge 1406 applies glue or another suitable adhesive to the note paper. The glue cartridge 1406 comprises a supply of releasable glue or adhesive (e.g. using adhesive microspheres) that is spring biased upwardly. Thus, the glue or adhesive moves upwardly as it is being used. With this arrangement, glue or adhesive is available for applying the note to the main sheet. The glue cartridge 1406 is preferably mechanized to move similar to a print head on a dot matrix printer and will swipe the top of the note with glue or adhesive. The glue cartridge 1406 will then retract (avoid interference with the paper) and the roller 1400f will drive the printed document (to which the note is to be applied) and will sandwich the note driven by the roller 1400e. By action of the paper controller, the roller 1400f transfers the note paper onto the printed main document to the vertical position (lengthwise along the sheet of paper from the print job) that the user had requested before the initiation of the note pasting process or that was determined in advance. The printed document along with the note is then discharged from the image forming apparatus 100.

Figure 15:
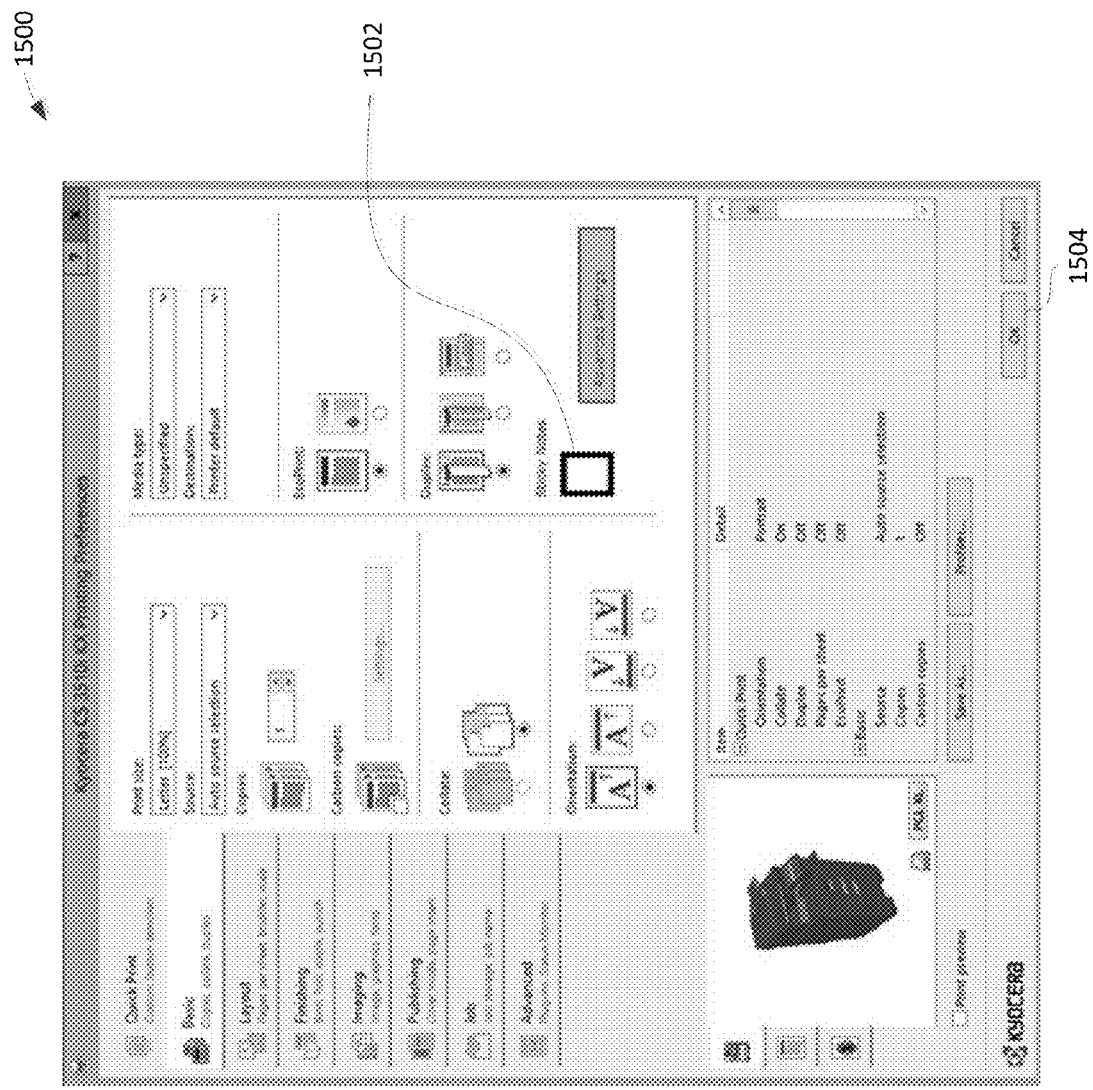
FIG. 15 is a view of a user interface that may be utilized in accordance with one embodiment of the present invention.
Figure 16:
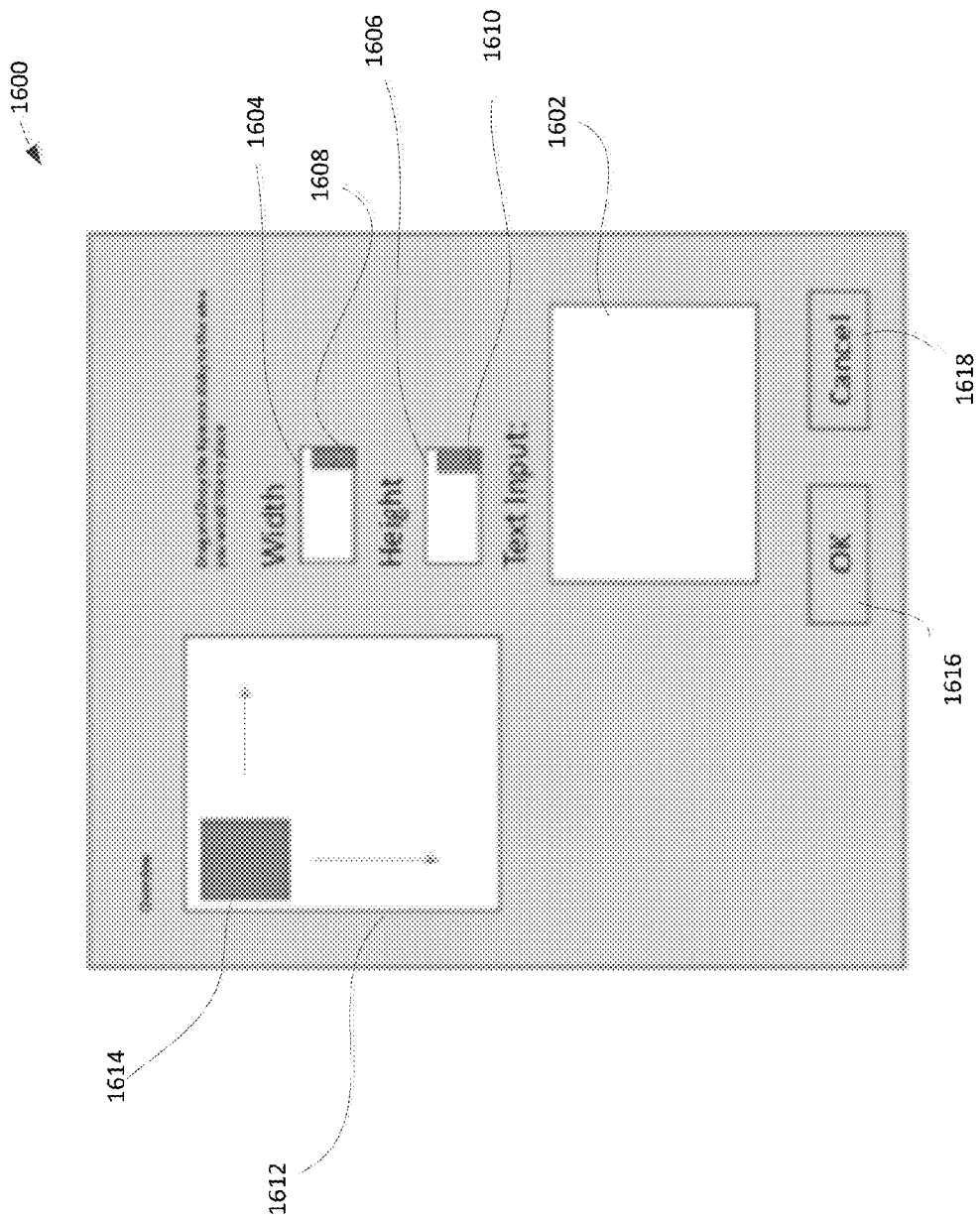
FIG. 16 illustrates a second user interface that may be displayed subsequent to the user interface of FIG. 15, to receive one or more user inputs for parameters relating to the sticky notes selection box shown in FIG. 15.
Figure 17:
FIG. 17 is a flow chart illustrating the note applying method, according to one embodiment of the present invention.

In addition to the vertical (top and down) positioning of the note described in the previous paragraph, since the note pasting unit 124 is of a single unitary construction, housed in housing 1430, horizontal (left and right) positioning on the printed page is also possible, through the use of appropriate actuators and control signals, based on the user inputs described with respect to FIGS. 15-17. These actuators are shown and described with reference to FIGS. 14B and 14C, and include two pasting unit horizontal motors 1418a and 1418b that are fixed relative to the finishing unit 102. The pasting unit horizontal motors 1418a and 1418b actuate to rotate pasting unit horizontal threaded bars 1420a and 1420b, which in turn cooperate with internally threaded pasting unit horizontal nuts 1422a and 1422b to cause the pasting unit horizontal nuts 1422a and 1422b to move horizontally (left or right) in a direction perpendicular to the note feed direction 1426. Since the housing 1430 is fixed or secured to the pasting unit horizontal nuts 1422a and 1422b, the housing 1430 therefore also moves horizontally (left or right) in a direction perpendicular to the note feed direction 1426. To provide support and guidance, pasting unit guide bars 1426a and 1426b extend co-linearly with the pasting unit horizontal threaded bars 1420a and 1420b to allow the housing 1430 to slide along the pasting unit guide bars 1426a and 1426b via cylindrical pasting unit guide sleeves 1424a and 1424b, which are attached to the housing 1430 and loosely circumscribe respective the pasting unit guide bars 1426a and 1426b. As an alternative to moving the entire housing 1430 via the pasting unit horizontal motors 1418a and 1418b, one or more components (e.g. rollers and/or other surfaces or mechanisms housed in housing 1430) can be moved instead, to thereby cause relative movement of the note (on such component) with respect to the print job paper. In addition, as shown in FIG. 14C, the roller 1400f presses down on the note and the sheet of paper from the print job to apply (i.e. paste/glue/adhere) the note to the specified location on the specified page of the print job (the printed main document).

The sequence of operations for the horizontal positioning of the note with respect to the print job page is then as follows, according to one embodiment:

1. The housing 1430 starts in a "ready" or home position.
2. The roller set 1412/1414 feeds note into the opening 1416 of the housing 1430.
3. The housing 1430 moves horizontally (left or right) based on user input, e.g., as received via user interfaces 1500 and/or 1600.
4. The note is then processed as described with reference to FIG. 14A.
5. The housing 1430 then returns back to the "ready" or home position.

In some example embodiments, the glue cartridge 1406 can be configured to be exchanged periodically and/or when the glue is short or empty. The exchange can be predicted, based on, for example, how much glue is used, which can be predicted according to sizes of notes pasted (these note sizes can be stored in the memory 108, for example). This exchange can be also predicted based on time, since the glue or adhesive can become defective (i.e. dry out) after a certain length of time. Therefore, the exchange may be recommended to a user after a predetermined time, even if the glue has not been used much.

4. Example User Interfaces

FIG. 15 is a view of a user interface 1500 that may be presented to a user to receive one or more inputs for controlling the finishing unit 102 of the image forming apparatus 100. The user interface 1500 may be displayed at the operation panel 106, but is more likely displayed at a user device (not shown) that is separate from the image forming apparatus 100. For example, the user device may be a desktop or laptop computer that is connected via a Local Area Network (LAN) to the image forming apparatus 100. Alternatively, the user device may be a wireless device, such as a smart phone, that can connect to the image forming apparatus 100 using a wireless network interface (Wi-Fi, Bluetooth, NFC, infrared, etc.). Most typical MFPs include one or more network interfaces (both wired and wireless), any of which would be suitable for various embodiments of the present invention.

As illustrated, the user interface 1500 is for a printer driver displayed on a user device and includes a plurality of user preference settings that may be selected for a particular print job. These include such preference settings as paper size, paper source (e.g. tray selection), media type, destination (e.g. printer selection), number of copies, collation, orientation, duplex selection, and many other preference settings. In addition, the user interface 1500 includes a "sticky notes" option that may be selected using a sticky notes selection box 1502. Alternative selection input mechanisms may also be used, such as a command line prompt, icon (pictorial) selection button, or others. In the example shown, after receiving a user action (e.g. a mouse click) on the sticky notes selection box 1502, the sticky notes option is selected and is applied to a particular print job or a number of subsequent print jobs upon the user clicking the "Ok" box 1504. While the example user interface 1500 of FIG. 15 is a windows-type interface, such as one that might be displayed in a Microsoft Windows or Apple Mac OS environment, a similar, but likely simplified, interface could be displayed on a wireless device, such as a smart phone.

FIG. 16 illustrates a second user interface 1600 that may be displayed subsequent to the user interface 1500, to receive one or more user inputs for parameters relating to the sticky notes selection box 1502. In the example shown, the user interface 1600 includes a text input box 1602 to receive an input from a user of textual or other input (e.g. images, characters, etc.). Such input may include standard formatting choices, such as font, text size, text color, justification, and rotation, among others.

The user interface 1600 also includes a width input 1604 and a height input 1610 for receiving respective inputs relating to the width and height of a note. Also shown are optional width and height adjustment fields 1608 and 1610, in which up-down arrows, sliders, or other graphical adjustment methods can be used to adjust the width or height of a note.

A note visualization field 1612 illustrates a representation 1614 of a note on a sheet of paper, based on received user inputs. For example, the sheet of paper could be shown with an aspect ratio matching the selected paper size (e.g. A4 or 8½"×11") for the print job. The representation 1614 of the note could be shown in the color and aspect ratio specified in user inputs. The representation 1614 could also display the text entered in the text input box 1602.

The note visualization field 1612 also preferably allows the user to indicate the position of the note on the printed sheet by allowing the user to drag the representation 1614 of the note, using a mouse, finger, stylus, or other dragging user interface too. Alternatively, the note could be positioned via a specified numerical position (e.g. in centimeters or inches from the upper left corner) or via arrows that allow the note to be moved up, down, left, or right on the page.

The user interface 1600 also includes an "OK" button 1616 for accepting the specified inputs and a "Cancel" button 1618 for canceling the specified inputs and closing the user interface 1600.

While the user interface 1600 is shown as a window-based interface, alternative interface environments could be used without departing from the intended scope of various embodiments of the invention.

5. Example Finishing Method

FIG. 17 is a flow chart illustrating the note applying method 1700, according to one embodiment of the present invention. The method 1700 may be performed in conjunction with presenting at least one of the user interfaces 1500 and 1600 to a user.

The method 1700 includes, at block 1702, a start of a print job to be printed on an image forming apparatus, such as the image forming apparatus 100.

At block 1704, the method 1700 includes receiving a user selection of a note applying function, e.g., on a printer driver screen. For example, the user could select the sticky notes selection box 1502 in the user interface 1500, to cause the user interface 1600 to be displayed to the user for subsequent blocks of the method 1700. It should be noted, like other blocks in the method 1700, the subsequent blocks may be performed in an order other than what is illustrated in FIG. 17. The subsequent blocks refer to user specifications of note attributes, which may include, for example, size, position (e.g. X-Y coordinates), print job location, color (e.g. printed color or sheet feeder select), text rotation, content attributes (e.g. autowrap characteristics of text, carriage returns, etc., text font, style, size, color, justification, etc.), image(s) (e.g. file upload details or photos to be taken with a mobile device or PC camera), handwriting or drawing, and others.

At block 1706, the method 1700 includes receiving a user selection of a position of the note in the print job. For example, the user may specify a page number to which the note is to be applied, and the user may specify a position on that particular page at which the note is to be pasted or otherwise applied. Specifying the position may include, for example, specifying an exact position of a reference point on the note, such as a distance from the upper right corner of the page at which the upper right corner of the note is to be positioned. Alternatively, the user may be presented with coarser options to select from, such as upper right, middle right, lower right, upper left, middle left, lower left, or centered, for example. The position may be specified, for example, using the note visualization field 1612 of the user interface 1600, for example.

At block 1708, the method 1700 includes receiving a user selection of a size of the note, such as by using the width input 1604 and height input 1610 and/or the width and height adjustment fields 1608 and 1610 of the user interface 1600. The method preferably includes constraining the note size to be no larger than (and preferably only a fraction of) the page size for the print job.

At block 1710, the method 1700 includes receiving a text input from the user. For example, the user could use the text input box 1602 of the user interface 1600 to specify the content of the text input, including any formatting, etc., to be applied. Block 1710 could optionally also include specifying the background color of the note.

At block 1712, the method 1700 includes printing the print job or at least a portion of the print job on the image forming apparatus 100. For example, if the note is to be applied to the first page of the print job, then the entire print job can be printed, followed by the printing and pasting of the note on the first page of the completed print job. Alternatively, the first page of the print job can be printed, followed by the printing and pasting of the note on the first page, and then followed by the printing of the remainder of the print job (assuming no other notes are to be printed and pasted for that print job).

At block 1714, after printing at least the portion of the print job, the method 1700 includes printing the note on the image forming apparatus 100, according to the user selections of blocks 1706-1710. For example, the image forming apparatus 100 could print the note using the same paper source as the print job. Alternatively, another paper source could be used. The printed note is then cut by the cutter 140 of the note cutting unit 122 of the image forming apparatus 100, according to the user selection of block 1708.

At block 1716, once the note is cut, the method 1700 includes the note pasting unit 124 of the image forming apparatus pasting the note to the appropriate location of the print job. For example, pasting the note may include the note pasting unit 124 applying adhesive to the note and applying the note to the print job at the selected location.

At block 1718, the method includes the image forming apparatus 100 discharging the print job (e.g. at an output tray of the image forming apparatus 100) with the attached note.

Control of the note cutting unit 122 and note pasting unit 124 are respectively provided by the main controller 126 and the paper controller 142. Upon receiving user selections (e.g. blocks 1706-1710 of the method 1700), the CPU 104 communicates the user selections (i.e. note attributes) to the main controller 126 of the note cutting unit 122 and/or to the paper controller 142 of the note pasting unit. For example, if the user specifies a note size of 2 cm×3 cm, the CPU 104 communicates this size information to the main controller 126 of the note cutting unit 122. The main controller 126, in turn, communicates control signals to the driving unit 128 so that the vertical paddle driving unit 130 appropriately drives the vertical paddle 132, the horizontal paddle driving unit 134 appropriately drives the horizontal paddle 136, and the cutter driving unit 138 appropriately drives the cutter 140. Control signals will, in turn, drive cutter blade motor 1008, cutter horizontal motors 812*a* and 812*b*, cutter vertical motors 818*a* and 818*b*, cutter pivot motor 1002, cutter lift piston 1006, pasting unit horizontal motors 1418*a* and 1418*b*, and various motorized/driving rollers with appropriate timings to achieve desired cutting dimensions and to coordinate movement of the cutting mechanisms with one another. Similarly, for note pasting, the CPU 104 communicates relevant user selections to the paper controller 142, according to various embodiments. The paper controller 142 then controls the paper control roller 144 and other components described above with respect to the note pasting unit to paste the note at the specified location on a sheet of the print job.

An embodiment of the present disclosure has been described above; however, the scope of the disclosure is not limited to the embodiment, and may be implemented by adding various modifications within the scope not departing from the spirit of the disclosure. Functionally equivalent apparatuses within the scope of the disclosure, in addition to those enumerated herein, will be apparent to those skilled in the art from the foregoing descriptions. Such modifications and variations are intended to fall within the scope of the appended claims. With respect to any or all of the flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the flow charts discussed herein, and these flow charts may be combined with one another, in part or in whole.

The invention claimed is:

1. A finishing unit for applying a note onto a printed document that exits from an image forming apparatus, the finishing unit comprising:
    a note cutting unit for cutting a sheet of paper to a note of a desired size, wherein the note cutting unit includes a vertical paddle for keeping the paper in proper vertical orientation; and
    a note pasting unit for applying the note onto the printed document that exits from the image forming apparatus.

2. The finishing unit of claim 1 wherein the vertical paddle is provided with at least one set of motorized gears that cooperate with a screw threaded conveyor to move the vertical paddle to act on the paper.

3. The finishing unit of claim 1 wherein the note cutting unit includes a horizontal paddle for keeping the paper in proper horizontal orientation.

4. The finishing unit of claim 3 wherein the horizontal paddle is provided with at least one set of motorized gears that cooperate with a screw threaded conveyor to move the horizontal paddle to act on the paper.

5. The finishing unit of claim 1 wherein the note cutting unit is provided with a plurality of spring rollers and a plurality of motorized rollers, wherein the spring rollers, powered by the motive force of the motorized rollers, can guide the paper through the note cutting unit.

6. The finishing unit of claim 1 wherein the note cutting unit includes at least one cutter for cutting the paper into a note of the desired size, and wherein the at least one cutter is positioned via at least one screw threaded conveyor.

7. The finishing unit of claim 6 wherein the note cutting unit is provided with a second cutter, the at least one cutter being capable of cutting the paper in a vertical direction and the second cutter being capable of cutting the paper in a horizontal direction.

8. The finishing unit of claim 6 wherein the note pasting unit includes
    a plurality of rollers that conveys the note paper from the note cutting unit to a glue cartridge, wherein at least one of the plurality of roller positions the note to cause a specified amount of glue to be applied to the note paper.

9. A finishing unit for applying a note onto a printed document that exits from an image forming apparatus, the finishing unit comprising:
    a note cutting unit for cutting a sheet of paper to a note of a desired size, wherein the note cutting unit includes a horizontal paddle for keeping the paper in proper horizontal orientation; and
    a note pasting unit for applying the note onto the printed document that exits from the image forming apparatus.

10. The finishing unit of claim 9 wherein the horizontal paddle is provided with at least one set of motorized gears that cooperate with a screw threaded conveyor to move the horizontal paddle to act on the paper.

11. The finishing unit of claim 9 wherein the note cutting unit includes a vertical paddle for keeping the paper in proper vertical orientation.

12. The finishing unit of claim 11 wherein the vertical paddle is provided with at least one set of motorized gears that cooperate with a screw threaded conveyor to move the paddle to act on the paper.

13. The finishing unit of claim 9 wherein the note cutting unit is provided with a plurality of spring rollers and a plurality of motorized rollers, wherein the spring rollers, powered by the motive force of the motorized rollers, can guide the paper through the note cutting unit.

14. The finishing unit of claim 9 wherein the note cutting unit includes at least one cutter for cutting the paper into a note of the desired size, and wherein the at least one cutter is positioned via at least one screw threaded conveyor.

15. The finishing unit of claim 14 wherein the cutter is provided with a set of rails that allows the cutter to cut the paper in a vertical direction and a horizontal direction.

16. The finishing unit of claim 15 wherein the cutter pivots about a pivot point and includes a lift piston to allow the cutter to clear a plate.

17. The finishing unit of claim 14 wherein the note cutting unit is provided with a second cutter, the at least one cutter being capable of cutting the paper in a vertical direction and the second cutter being capable of cutting the paper in a horizontal direction.

18. An image forming apparatus comprising:
    an image forming unit including at least one of a scanning unit, a copying unit, and a printing unit;
    a finishing unit including a note cutting unit for cutting paper into a note of a desired size, wherein the note cutting unit of the finishing unit includes a horizontal paddle for keeping the paper in proper horizontal orientation and a vertical paddle for keeping the paper in proper vertical orientation; and
    a note pasting unit for applying the note onto the printed document.

19. The image forming apparatus of claim 18 wherein the note cutting unit of the finishing unit further includes
    a plurality of spring rollers and a plurality of motorized rollers, wherein the spring rollers, powered by the motive force of the motorized rollers, can guide the paper through the note cutting unit; and
    at least one cutter capable of cutting the paper in the vertical direction and the horizontal direction.

20. The image forming apparatus of claim 18 wherein the note pasting unit of the finishing unit includes
    a glue cartridge unit for applying glue onto the note; and a series of rollers for conveying the note from the note cutting unit to a glue cartridge, the rollers conveying the note past the glue cartridge.

* * * * *